US012631009B2

(12) United States Patent　　　　　(10) Patent No.:　US 12,631,009 B2
Murakami et al.　　　　　　　　　　　　(45) Date of Patent:　　May 19, 2026

(54) STATE MANAGEMENT DEVICE FOR WORK MACHINE

(71) Applicant: Hitachi Construction Machinery Co., Ltd., Tokyo (JP)

(72) Inventors: Kaito Murakami, Tsukuba (JP); Takeshi Shiina, Moriya (JP); Shunichi Suda, Tsukuba (JP); Keita Ogasawara, Tsukuba (JP); Wataru Imachi, Bunkyo-ku (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 357 days.

(21) Appl. No.: 18/022,786

(22) PCT Filed: Dec. 2, 2021

(86) PCT No.: PCT/JP2021/044356
§ 371 (c)(1),
(2) Date: Feb. 23, 2023

(87) PCT Pub. No.: WO2022/138058
PCT Pub. Date: Jun. 30, 2022

(65) Prior Publication Data
US 2024/0044112 A1　　Feb. 8, 2024

(30) Foreign Application Priority Data
Dec. 22, 2020　(JP) ................................. 2020-212699

(51) Int. Cl.
E02F 9/26　　　(2006.01)
G06F 3/041　　(2006.01)
(52) U.S. Cl.
CPC .............. E02F 9/267 (2013.01); G06F 3/041 (2013.01)

(58) Field of Classification Search
CPC ............ E02F 9/267; E02F 9/205; G06F 3/041
See application file for complete search history.

(56) References Cited

U.S. PATENT DOCUMENTS

2007/0055537 A1* 3/2007 Bassez ................... G16H 30/20
　　　　　　　　　　　　　　　　　　　　　　　705/2
2014/0244101 A1* 8/2014 Chitty .................... E02F 9/268
　　　　　　　　　　　　　　　　　　　　　　　701/32.4

(Continued)

FOREIGN PATENT DOCUMENTS

JP　　　　2005-163470 A　　6/2005
JP　　　　2014222003 A　* 11/2014

(Continued)

OTHER PUBLICATIONS

Machine Translation of JP 2014222003 A (Year: 2014).*

(Continued)

*Primary Examiner* — Justin S Lee
*Assistant Examiner* — Alexander George Matta
(74) *Attorney, Agent, or Firm* — Crowell & Moring LLP

(57)　　　　　ABSTRACT

A state management device manages the state of a work machine. The work machine includes a work device, a posture sensor that senses posture information regarding the work device, and an action sensor that senses action information regarding actuators. The state management device includes a controller that performs a computation on the basis of the results of sensing performed by the posture sensor and the action sensor, and an output device that outputs the result of computation performed by the controller, in a recognizable manner. On the basis of the posture information regarding the work device and the action information regarding the actuators, the controller computes the cumulative damage degree of a driven member, stores temporal changes in the cumulative damage degree at a predetermined position of the driven member, and outputs (Continued)

the temporal changes in the cumulative damage degree at the predetermined position to the output device.

5 Claims, 11 Drawing Sheets

(56) References Cited

U.S. PATENT DOCUMENTS

| | | | |
|---|---|---|---|
| 2015/0213166 A1* | 7/2015 | Mills | G06F 30/23 703/2 |
| 2017/0292250 A1 | 10/2017 | Sato et al. | |
| 2021/0158409 A1 | 5/2021 | Minemura | |
| 2021/0230841 A1 | 7/2021 | Kurosawa | |
| 2022/0049477 A1* | 2/2022 | Yamanaka | G06F 18/214 |
| 2022/0251808 A1* | 8/2022 | Miyoshi | G01L 5/12 |

FOREIGN PATENT DOCUMENTS

| | | |
|---|---|---|
| SE | 1950660 A1 | 12/2020 |
| WO | WO 2019/181923 A1 | 9/2019 |
| WO | WO 2020/013252 A1 | 1/2020 |
| WO | WO 2020/080538 A1 | 4/2020 |

OTHER PUBLICATIONS

International Preliminary Report on Patentability (PCT/IB/338 & PCT/IB/373) issued in PCT Application No. PCT/JP2021/044356 dated Jul. 6, 2023, including English translation of document (Japanese-language Written Opinion (PCT/ISA/237), filed on Feb. 23, 2023) (6 pages).
Extended European Search Report issued in European Application No. 21910210.0 dated Oct. 30, 2024 (8 pages).
International Search Report (PCT/ISA/210) issued in PCT Application No. PCT/JP2021/044356 dated Feb. 15, 2022 with English translation (five (5) pages).
Japanese-language Written Opinion (PCT/ISA/237) issued in PCT Application No. PCT/JP2021/044356 dated Feb. 15, 2021 (four (4) pages).

* cited by examiner

FIG. 10

STATE MANAGEMENT DEVICE FOR WORK MACHINE

TECHNICAL FIELD

The present invention relates to a state management device for a work machine.

BACKGROUND ART

A state display device for an excavator that displays the distribution of degrees of damages accumulated in the excavator on a display screen has been known (see Patent Document 1). The state display device for the excavator described in Patent Document 1 displays the distribution of the degrees of damages accumulated in excavator parts, as an image on the display screen in a mutually comparable state for each operation status, on the basis of data representing the distribution of the degrees of damages accumulated in the excavator parts under a plurality of operation statuses different from each other.

PRIOR ART DOCUMENT

Patent Document

Patent Document 1: JP-2014-222003-A

SUMMARY OF THE INVENTION

Problem to be Solved by the Invention

A work machine such as an excavator is preferably operated except during maintenance because the time efficiency of work is important. When a work machine is operated over a long period of time, the operation status changes every moment during the operation, and the cumulative damage degrees of parts change due to various factors. In the state display device described in Patent Document 1, the cumulative damage degree at the time of maintenance can be checked by the distribution of the accumulated damage degrees at the time of maintenance being displayed. However, the state display device described in Patent Document 1 is not capable of checking temporal changes in the cumulative damage degree of the work machine during the operation of the work machine. Therefore, the technology described in Patent Document 1 involves such a risk that the life of the parts cannot be predicted appropriately.

An object of the present invention is to appropriately predict the life of a driven member of a work device.

Means for Solving the Problem

According to an aspect of the present invention, a state management device for a work machine includes a controller and an output device, the controller being configured to perform a computation on the basis of the results of sensing performed by a posture sensor that senses posture information regarding a work device that is configured by rotatably coupling, by a plurality of joints, a plurality of driven members driven by a plurality of actuators and an action sensor that senses action information regarding the actuators, in order to manage the state of the work machine including the work device, the posture sensor, and the action sensor, and the output device outputting the result of computation performed by the controller, in a recognizable manner. The controller computes the cumulative damage degree of a corresponding one of the driven members, stores temporal changes in the cumulative damage degree at a predetermined position of the driven member, and outputs the temporal changes in the cumulative damage degree at the predetermined position to the output device, on the basis of the posture information regarding the work device and the action information regarding the actuators.

Advantages of the Invention

According to the present invention, it is possible to appropriately predict the life of a driven member of a work device.

BRIEF DESCRIPTION OF THE DRAWINGS

FIG. 10 is a diagram for illustrating a configuration of a state management device according to a second embodiment.

MODES FOR CARRYING OUT THE INVENTION

A state management device for a work machine according to embodiments of the present invention will be described with reference to the drawings.

First Embodiment

Figure 1:
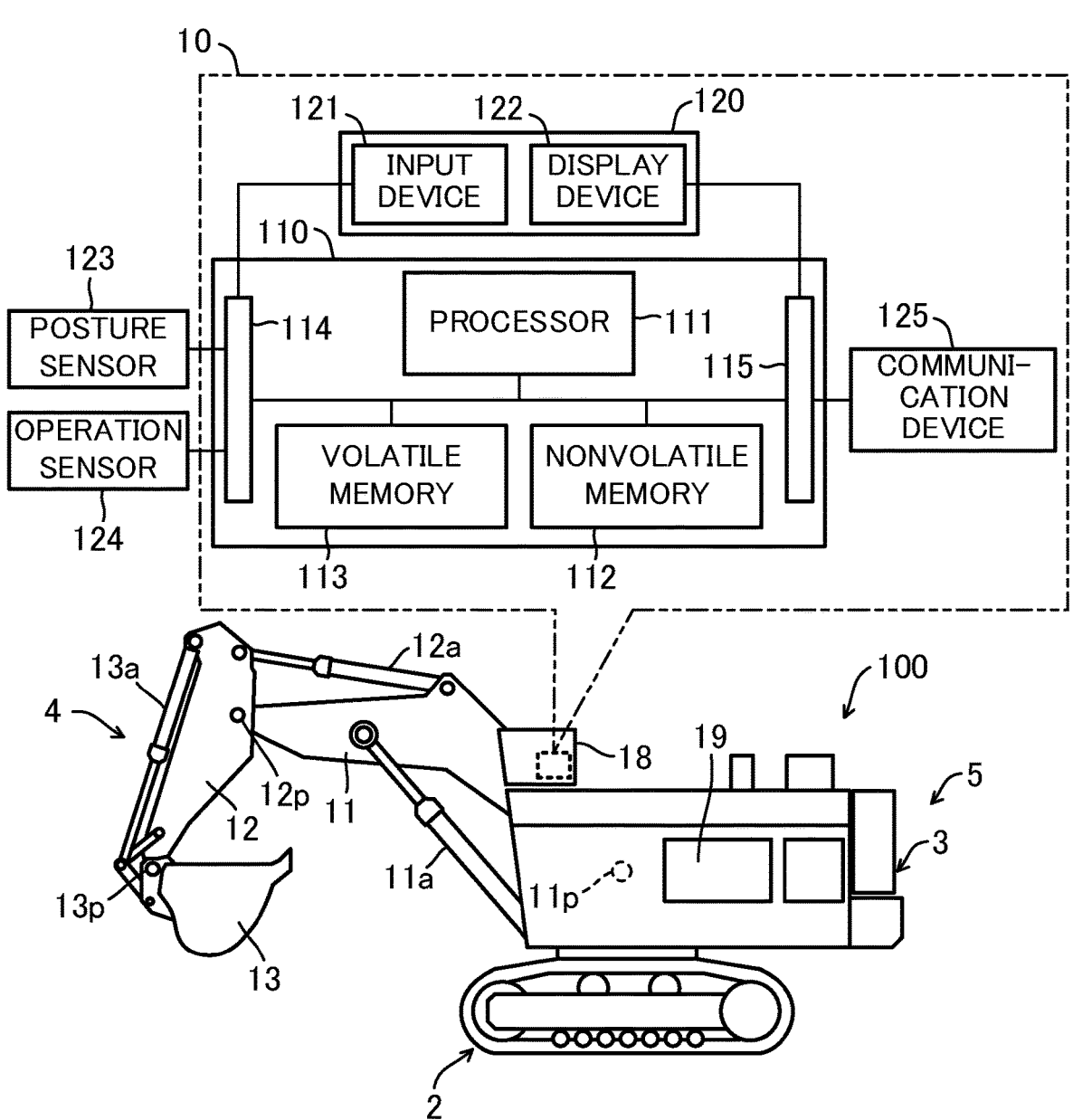
FIG. 1 is a diagram for illustrating a configuration of a state management device according to a first embodiment.

FIG. 1 is a diagram for illustrating a configuration of a state management device 10 according to a first embodiment of the present invention. As illustrated in FIG. 1, the state management device 10 according to the first embodiment is mounted on a work machine 100. In the embodiment, an example in which the work machine 100 is a crawler type hydraulic excavator will be described. The work machine 100 performs such work as civil engineering work, construction work, demolition work, or dredging work at work sites.

The work machine 100 includes a machine body 5 and a work device 4 attached to the machine body 5. The machine body 5 has a crawler type track structure 2 and a swing structure 3 provided in a swingable manner on the track structure 2. The work device 4 is an articulated work device attached to the swing structure 3, has a plurality of actuators and a plurality of driven members driven by the plurality of actuators, and has a configuration in which the plurality of driven members are rotatably coupled by a plurality of joints.

The work device 4 has a configuration in which three driven members (a boom 11, an arm 12, and a bucket 13) are coupled in series. The base end of the boom 11 is rotatably coupled to the front of the swing structure 3 via a boom pin 11p that is a joint. The base end of the arm 12 is rotatably coupled to the distal end of the boom 11 via an arm pin 12p that is a joint. The bucket 13 is rotatably coupled to the distal end of the arm 12 via a bucket pin 13p that is a joint. The boom pin 11p, the arm pin 12p, and the bucket pin 13p are arranged parallel to each other, and each of the driven members (the boom 11, the arm 12, and the bucket 13) is relatively rotatable in the same plane.

The boom 11 is rotated and driven by the extension/contraction action of a boom cylinder 11a that is an actuator (hydraulic cylinder). The arm 12 is rotated and driven by the extension/contraction action of an arm cylinder 12a that is an actuator (hydraulic cylinder). The bucket 13 is rotated and driven by the extension/contraction action of a bucket cylinder 13a that is an actuator (hydraulic cylinder).

One end side of the boom cylinder 11a is rotatably connected to the boom 11, and the other end side thereof is rotatably connected to the frame of the swing structure 3. One end side of the arm cylinder 12a is rotatably connected to the arm 12, and the other end side thereof is rotatably connected to the boom 11. One end side of the bucket cylinder 13a is rotatably connected to the bucket 13 via a bucket link (link member), and the other end side thereof is rotatably connected to the arm 12.

The swing structure 3 includes an operation room 18 where an operator boards and an engine room 9 housing an engine and hydraulic equipment such as a hydraulic pump driven by the engine. The engine is the power source of the work machine 100 and includes, for example, an internal combustion engine such as a diesel engine.

The work machine 100 includes a state management device 10 that manages the state of the work machine 100, a posture sensor 123 that senses posture information (posture information regarding the work device 4 and posture information regarding the machine body 5) regarding the work machine 100, and an action sensor 124 that senses action information regarding the actuators (the boom cylinder 11a, the arm cylinder 12a, and the bucket cylinder 13a).

The state management device 10 includes an in-vehicle controller 110 that is a controller for controlling a display device 122 and the like, a touch panel monitor 120, and a communication device 125 for communicating with an external server through a communication network. The touch panel monitor 120 has an input device 121 for inputting predetermined information to the in-vehicle controller 110 on the basis of an operation performed by a user of the state management device 10 (the operator of the work machine 100 in the embodiment), and the display device 122 that displays a display image on a display screen on the basis of a control signal from the in-vehicle controller 110. The display device 122 has a display screen such as a liquid crystal display, and the input device 121 has a touch sensor formed on the liquid crystal display. The display device 122 functions as an output device for outputting a result of computation performed by the in-vehicle controller 110 to the display screen, in a recognizable manner.

The posture sensor 123 includes a plurality of angle sensors (a boom angle sensor, an arm angle sensor, a bucket angle sensor, a front/rear inclination angle sensor, a left/right inclination angle sensor, and a swing angle sensor) that sense information (posture information) related to the posture of the work machine 100 and output the result of sensing to the in-vehicle controller 110. The boom angle sensor is attached to the boom pin 11p and senses posture information representing the rotation angle (boom angle) of the boom 11 with respect to the swing structure 3. The arm angle sensor is attached to the arm pin 12p and senses posture information representing the rotation angle (arm angle) of the arm 12 with respect to the boom 11. The bucket angle sensor is attached to the bucket pin 13p and senses posture information representing the rotation angle (bucket angle) of the bucket 13. The front/rear inclination angle sensor is attached to the swing structure 3 and senses posture information representing the inclination angle (pitch angle) of the swing structure 3 in the front/rear direction with respect to the reference plane (for example, the horizontal plane). The left/right inclination angle sensor is attached to the swing structure 3 and senses posture information representing the inclination angle (roll angle) of the swing structure 3 in the left/right direction. The swing angle sensor senses posture information representing the relative angle (swing angle) of the swing structure 3 with respect to the track structure 2 in a plane perpendicular to the swing center axis.

As each angle sensor configuring the posture sensor 123, for example, a potentiometer that outputs a signal (voltage) according to the angle of a member can be employed. In addition, as the angle sensor, an IMU (Inertial Measurement Unit) that acquires the angular speed and acceleration of three orthogonal axes, computes the angle of the member on the basis of the acquired data, and outputs the computation result to the in-vehicle controller 110 as posture information can be employed.

The action sensor 124 senses information (action information) related to the action of the actuator and outputs the result of sensing to the in-vehicle controller 110. The action sensor 124 includes, for example, a cylinder pressure gauge 124a, a hydraulic operating oil thermometer 124b, an engine tachometer 124c, a hydraulic pump delivery pressure gauge 124d, a hydraulic motor inlet pressure gauge 124e, and an accelerometer 124f (see FIG. 2).

The cylinder pressure gauge 124a includes a boom bottom pressure sensor that senses action information representing the pressure (bottom pressure) of hydraulic operating oil in the bottom-side oil chamber of the boom cylinder 11a, a boom rod pressure sensor that senses action information representing the pressure (rod pressure) of hydraulic operating oil in the rod-side oil chamber of the boom cylinder 11a, an arm bottom pressure sensor that senses action information representing the pressure (bottom pressure) of hydraulic operating oil in the bottom-side oil chamber of the arm cylinder 12a, an arm rod pressure sensor that senses action information representing the pressure (rod pressure) of hydraulic operating oil in the rod-side oil chamber of the arm cylinder 12a, a bucket bottom pressure sensor that senses action information representing the pressure (bottom pressure) of hydraulic operating oil in the bottom-side oil chamber of the bucket cylinder 13a, and a bucket rod pressure sensor that senses action information representing the pressure (rod pressure) of hydraulic operating oil in the rod-side oil chamber of the bucket cylinder 13a.

The hydraulic operating oil thermometer 124b is a sensor that senses the temperature of hydraulic operating oil supplied to a hydraulic motor, a hydraulic cylinder, and the like by a hydraulic pump, which is not illustrated in the drawing.

The engine tachometer 124c is a rotation sensor that senses the rotational speed of the engine, which is not illustrated in the drawing. The hydraulic pump delivery pressure gauge 124d is a pressure sensor that senses the pressure of hydraulic operating oil supplied from the hydraulic pump, which is not illustrated in the drawing, to the hydraulic motor, the hydraulic cylinder, and the like. The hydraulic motor inlet pressure gauge 124e is a pressure sensor that senses the pressure of hydraulic operating oil supplied to a swing hydraulic motor, a travelling hydraulic motor, and the like, which are not illustrated in the drawing. The accelerometer 124f is an acceleration sensor that senses the vibration acceleration generated in the track structure 2 and the swing structure 3. Each of the sensors 124a, 124b, 124c, 124d, 124e, and 124f outputs the results of sensing to the in-vehicle controller 110 as action information regarding the actuators.

As illustrated in FIG. 1, the in-vehicle controller 110 includes a computer including a processor 111 such as a CPU (Central Processing Unit), an MPU (Micro Processing Unit), and a DSP (Digital Signal Processor), a nonvolatile memory 112 such as a ROM (Read Only Memory), a flash memory, and a hard disk drive, a volatile memory 113 that is what is generally called a RAM (Random Access Memory), an input interface 114, an output interface 115, and other peripheral circuits. It should be noted that the in-vehicle controller 110 may include one computer or a plurality of computers.

Programs capable of executing various computations are stored in the nonvolatile memory 112. That is, the nonvolatile memory 112 is a storage medium capable of reading a program for realizing the function of the embodiment. The processor 111 is a processing device that expands the program stored in the nonvolatile memory 112 into the volatile memory 113 to execute a computation, and performs a predetermined computation process for data taken in from the input interface 114, the nonvolatile memory 112, and the volatile memory 113 according to the program.

The input interface 114 converts an input operation signal and the like into data that can be computed by the processor 111. In addition, the output interface 115 generates a signal for output according to the result of computation in the processor 111, and outputs the signal to the display device 122 and the communication device 125.

Figure 2:
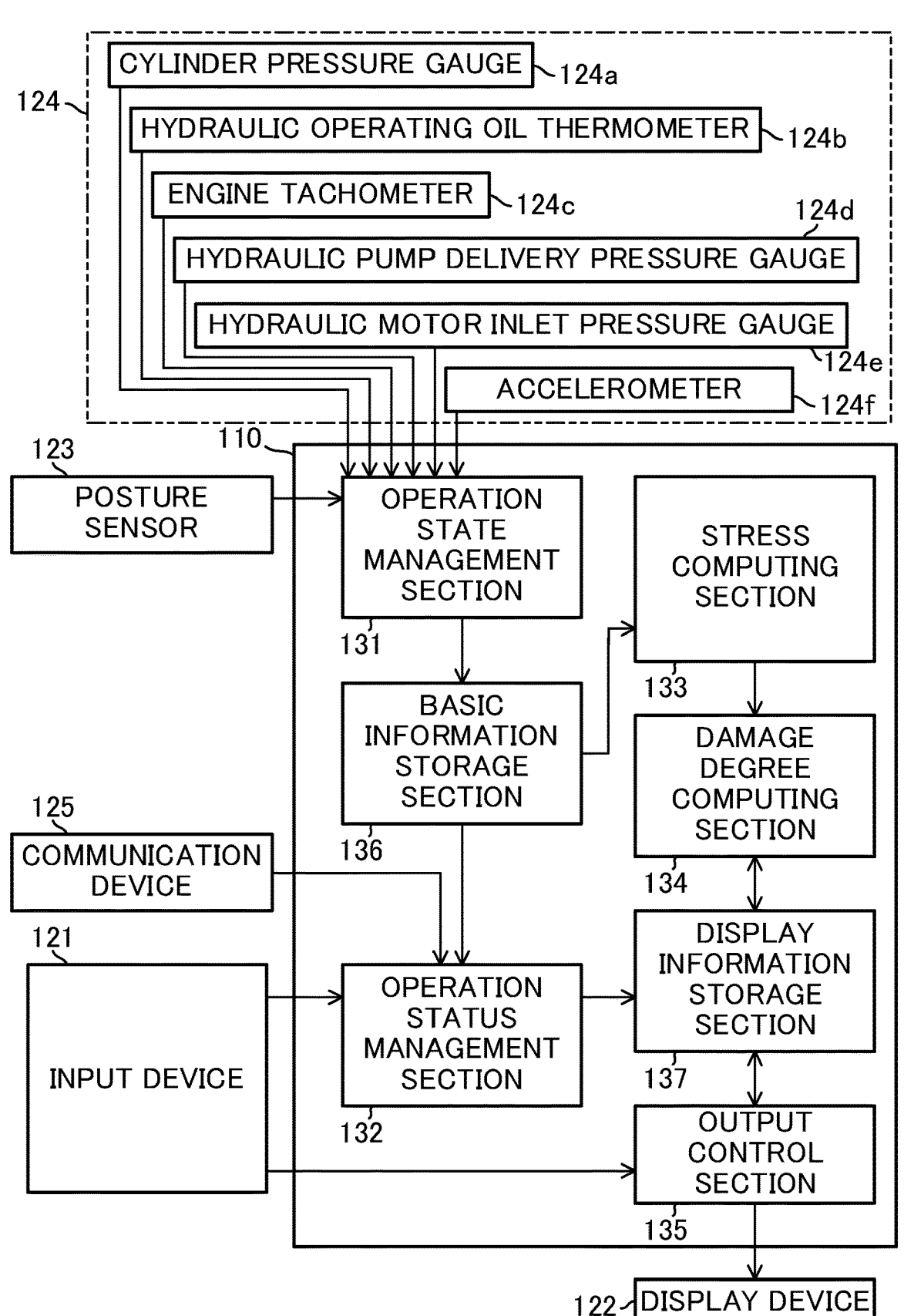
FIG. 2 is a functional block diagram of an in-vehicle controller.

FIG. 2 is a functional block diagram of the in-vehicle controller 110. On the basis of the result of sensing (posture information regarding the work machine 100) in the posture sensor 123 and the result of sensing (action information regarding the actuator) in the action sensor 124, the in-vehicle controller 110 computes cumulative damage degrees D of the driven members (the boom 11, the arm 12, and the bucket 13) configuring the work device 4, and outputs a control signal generated on the basis of the computation results to the display device 122 of the touch panel monitor 120. Hereinafter, the function of the in-vehicle controller 110 will be described in detail.

As illustrated in FIG. 2, the in-vehicle controller 110 has a basic information storage section 136 and a display information storage section 137 for storing information. It should be noted that the functions of the basic information storage section 136 and the display information storage section 137 are exhibited by programs stored in the non-volatile memory 112. The in-vehicle controller 110 includes an operation state management section 131 that acquires posture information and action information and stores the acquired information in the basic information storage section 136 in association with time, an operation status management section 132 that acquires an operation status from the input device 121 or acquires an operation status from an external server via the communication device 125, or identifies an operation status on the basis of the information stored in the basic information storage section 136, to store the operation status in the display information storage section 137 in association with time, a stress computing section 133 that computes the stresses of the driven members on the basis of the posture information and the action information (the action information obtained from the cylinder pressure gauge 124a, the hydraulic operating oil thermometer 124b, the engine tachometer 124c, the hydraulic pump delivery pressure gauge 124d, the hydraulic motor inlet pressure gauge 124e, and the accelerometer 124f) stored in the basic information storage section 136, a damage degree computing section 134 that computes the cumulative damage degrees of the driven members on the basis of the result of computation in the stress computing section 133 and stores the cumulative damage degrees in the display information storage section 137 in association with time, and an output control section 135 that generates a display image on the basis of an input signal from the input device 121 and the cumulative damage degrees stored in the display information storage section 137 and outputs a control signal for displaying the generated display image on the display device 122 to the display device 122. The functions of the operation state management section 131, the stress computing section 133, the damage degree computing section 134, the operation status management section 132, and the output control section 135 are exhibited by the processor 111 executing the programs stored in the nonvolatile memory 112. It should be noted that the stress computing section 133 also has a function as a stress storage section for storing temporal changes in the computed stresses, and the function is exhibited by the programs stored in the nonvolatile memory 112. In the embodiment, the time includes time information regarding years, months, days, hours, minutes, and seconds, and is measured by the timer function of the in-vehicle controller 110.

The operation state management section 131 acquires the posture information regarding the work machine 100 sensed by the posture sensor 123 and the action information regarding the actuators sensed by the action sensor 124, at predetermined time intervals, and stores the same in the basic information storage section 136 in association with the acquired time. In the basic information storage section 136, three-dimensional shape data and dimension data of the driven members configuring the work device 4 are stored in advance. The three-dimensional shape data includes mesh data including information related to mesh (elements) obtained by dividing the plurality of driven members of the work device 4 into small areas. The mesh data includes the coordinates of a plurality of nodes and the structural data regarding the plurality of nodes that defines the mesh (elements). In addition, in the basic information storage section 136, position information regarding elements of each joint part in the boom 11, position information regarding elements of each joint part in the arm 12, and position information regarding elements of each joint part in the bucket 13 are stored in advance as a plurality of pieces of position information. In addition, in the basic information storage section 136, boundary condition setting data for setting boundary conditions according to the posture of the work device 4 is stored in advance.

The stress computing section 133 computes the stresses generated in the driven members of the work device 4, by stress analysis based on the well-known finite element method. The stress computing section 133 refers to the boundary condition setting data stored in the basic information storage section 136 and sets boundary conditions (load boundary conditions and displacement boundary conditions) on the basis of the posture information and the action information.

The stress computing section 133 sets the boundary conditions on the basis of the posture information and the action information, computes the stress generated in each element obtained by dividing the driven members into a plurality of small areas by the finite element method, and stores the computed stress of each element at each time. The damage degree computing section 134 computes the cumulative damage degree on the basis of the temporal changes in the stress of each element computed by the stress computing section 133. Accordingly, the local distribution of the cumulative damage degrees in the driven members can be obtained.

The cumulative damage degree is computed on the basis of the extreme value of the stress extracted from the temporal changes in stress. The damage degree computing section 134 detects the maximum value and the minimum value of the temporal changes (time waveform) in stress. The damage degree computing section 134 obtains a stress range $\Delta\sigma$, which is a range in which the stress fluctuates, and the frequency of appearance for each stress range $\Delta\sigma$, on the basis of the maximum value and the minimum value. The frequency of appearance of a stress range $\Delta\sigma i$ is represented by ni.

Figure 3:
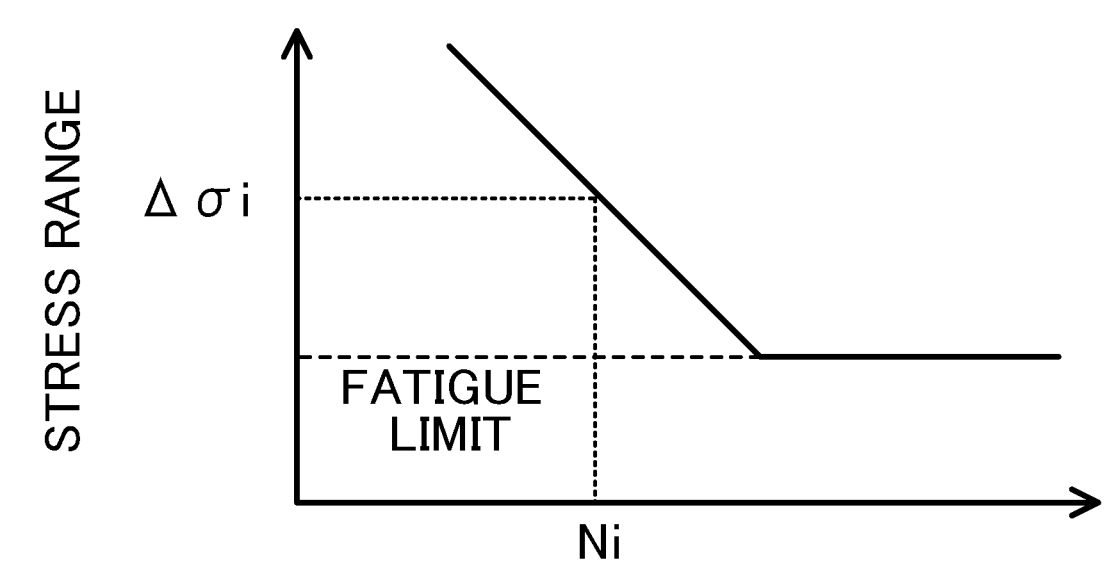
FIG. 3 is a diagram for illustrating an example of an S-N curve.

FIG. 3 is a diagram for illustrating an example of an S-N curve. As illustrated in FIG. 3, the fatigue life (the repeated number of times of fractures) in the stress range $\Delta\sigma i$ is Ni times. When the stress amplitude corresponding to the fatigue life Ni is ni, the cumulative damage degree D is represented by the following equation (1) according to the linear cumulative damage rule.

[Equation 1]

$$D = \sum_i \frac{n_i}{N_i} \tag{1}$$

The damage degree computing section 134 computes the cumulative damage degree D in each element of the driven members by the equation (1). The damage degree computing section 134 stores the cumulative damage degree D (that is, the temporal changes in the cumulative damage degree D) in each element for each time in the display information storage section 137.

Further, the damage degree computing section 134 computes the cumulative damage degree D for each operation status on the basis of the information regarding the operation status stored in the display information storage section 137 and the temporal changes in the stress computed by the stress computing section 133, and stores the temporal changes in the cumulative damage degree D for each operation status in the display information storage section 137.

The operation status management section 132 illustrated in FIG. 2 acquires the operation status or identifies the operation status, and stores the operation status in the display information storage section 137 in association with time. The operation status refers to external factors that can affect the damage degrees of the parts (driven members) of the work machine 100 during the operation of the work machine 100. The operation status includes, for example, such information as a work type, a work site, day/night, weather at a work site, an operator, and the skill level of an operator.

The operation status management section 132 identifies a work type on the basis of the posture information and the action information stored in the basic information storage section 136, and stores the identified work type in the display information storage section 137 in association with time. The work machine 100 performs excavation and loading work, which is a series of work, for example, starting excavation work by the work device 4, lifting the excavated earth and sand, swinging the swing structure 3, loading the earth and sand into a transport vehicle such as a dump truck, and returning the swing structure 3 and the work device 4 to the start position of the excavation work. The operation status management section 132 determines whether or not the excavation and loading work has been performed, on the basis of the posture information and the action information (the action information acquired from the cylinder pressure gauge 124*a*, the hydraulic operating oil thermometer 124*b*, the engine tachometer 124*c*, the hydraulic pump delivery pressure gauge 124*d*, the hydraulic motor inlet pressure gauge 124*e*, and the accelerometer 124*f*). In a case where it is determined that the excavation and loading work has been performed, the operation status management section 132 stores the work type used from the start time to the end time in the excavation and loading work in the display information storage section 137 as "excavation and loading work." In addition, the work machine 100 performs compaction work to compact the ground by moving the bucket 13 forward and using the back surface of the bucket 13. The operation status management section 132 determines whether or not the compaction work is being performed on the basis of the posture information and the action information. In a case where it is determined that the compaction work has been performed, the operation status management section 132 stores the work type used from the start time to the end time in the compaction work in the display information storage section 137 as "compaction work". It should be noted that the operation status management section 132 may identify the work type by considering the amount of operation of the operation member operated by the operator.

The operation status management section 132 identifies day and night on the basis of the time measured by the timer function of the in-vehicle controller 110, and stores the identified day and night information in the display information storage section 137 in association with time. The operation status management section 132 identifies a first time to a second time as day and the second time to the first time as night. It should be noted that the first time and the second time may be changed from day to day, or the first time and the second time may not be changed from day to day. On the basis of weather information acquired from an external server via the communication device 125, the operation status management section 132 identifies a work site and weather at the work site, and stores the identified work site and weather at the work site in the display information storage section 137 in association with time. The operation status management section 132 acquires identification information regarding the operator from the input device 121 and stores the acquired identification information in the display information storage section 137. The operation status management section 132 refers to a skill level table of the operator stored in the external server, via the communication device 125, acquires information regarding the skill level associated with the acquired identification information, and stores the same in the display information storage section 137. It should be noted that the method of acquiring the operation status by the operation status management section 132 is not limited to these. For example, the work machine 100 may be provided with a weather sensor to identify the weather at the work site on the basis of weather information from the weather sensor. The weather sensor includes, for example, a temperature sensor for measuring temperature information, an atmospheric pressure sensor for measuring atmospheric pressure information, a humidity sensor for acquiring humidity information, and the like.

On the basis of the input information from the input device 121, the output control section 135 causes the display device 122 to output (display) a mode (display image) representing the temporal changes in the cumulative damage degree at predetermined positions of the driven members that are stored in the display information storage section 137. In addition, when an operation signal for comparing the temporal changes in the cumulative damage degree with each other for each operation status is input from the input device 121, the output control section 135 generates a display image that is in a mode in which the temporal changes in the cumulative damage degree for each of a plurality of operation statuses can be compared with each other, and causes the display device 122 to output (display) the generated display image.

Figure 4:
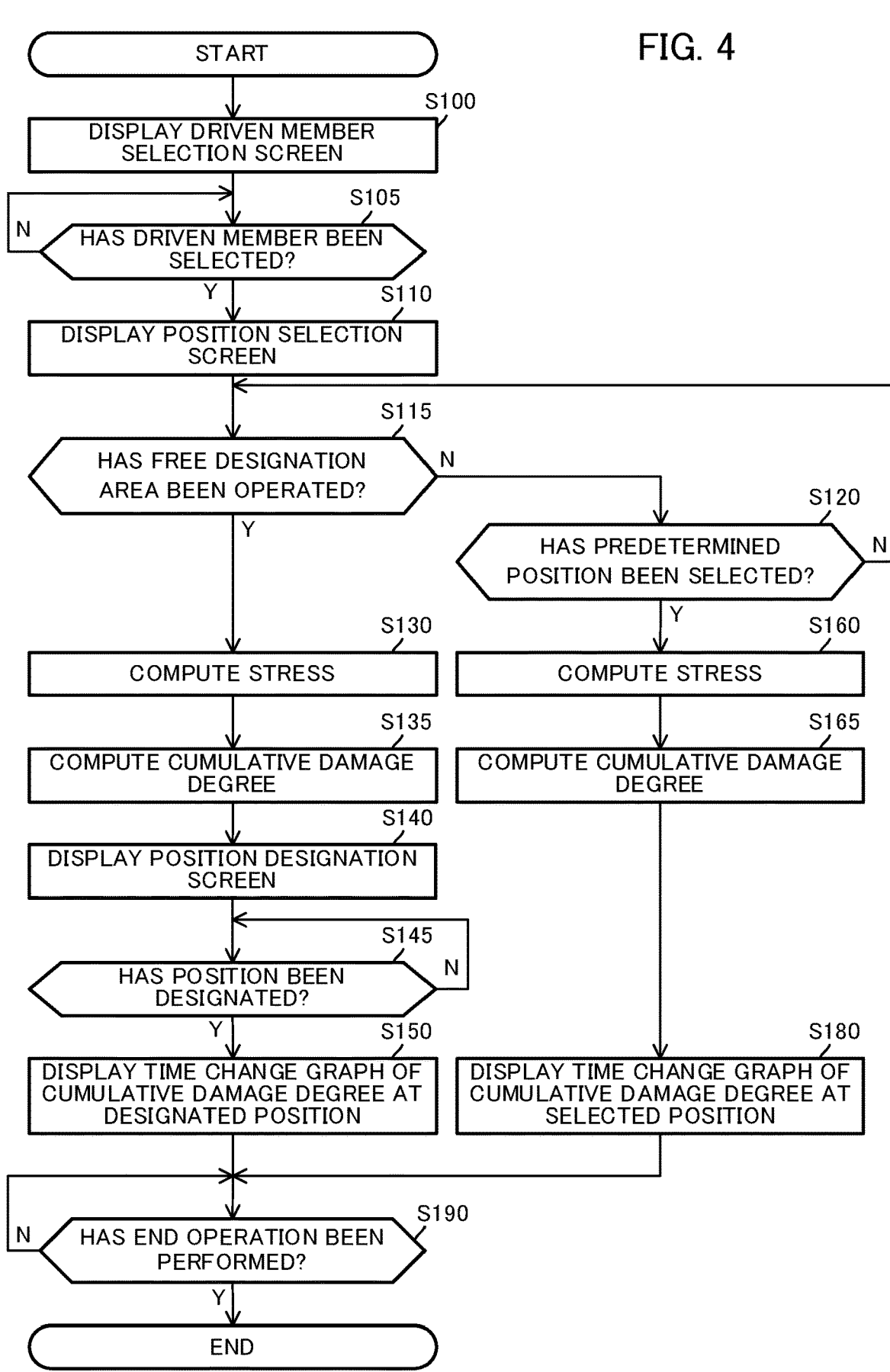
FIG. 4 is a diagram for illustrating the content of an output process of a time change graph of a cumulative damage degree executed by the in-vehicle controller.

With reference to FIG. 4, the content of an output process for a time change graph of the cumulative damage degree executed by the in-vehicle controller 110 will be described. The process of the flowchart illustrated in FIG. 4 is started when the user of the state management device 10 operates the input device 121 and a command for displaying a cumulative damage degree graph is input from the input device 121 to the in-vehicle controller 110.

In Step S100, the in-vehicle controller 110 causes the display device 122 to display a driven member selection screen for selecting only one driven member from among the plurality of driven members (the boom 11, the arm 12, and the bucket 13). On the driven member selection screen, a boom selection button, an arm selection button, and a bucket selection button are displayed. When the process of Step S100 is completed, the in-vehicle controller 110 proceeds to Step S105.

In Step S105, the in-vehicle controller 110 determines whether or not a driven member has been selected. When any one of the boom selection button, the arm selection button, and the bucket selection button is touched, the in-vehicle controller 110 determines that a driven member has been selected and proceeds to Step S110. In a case where none of the boom selection button, the arm selection button, and the bucket selection button is touched, the in-vehicle controller 110 determines that no driven member has been selected. The driven member selection determination process (S105) is repeatedly executed until it is determined that a driven member has been selected. Hereinafter, a case in which the arm selection button is touched will be described.

Figure 5:
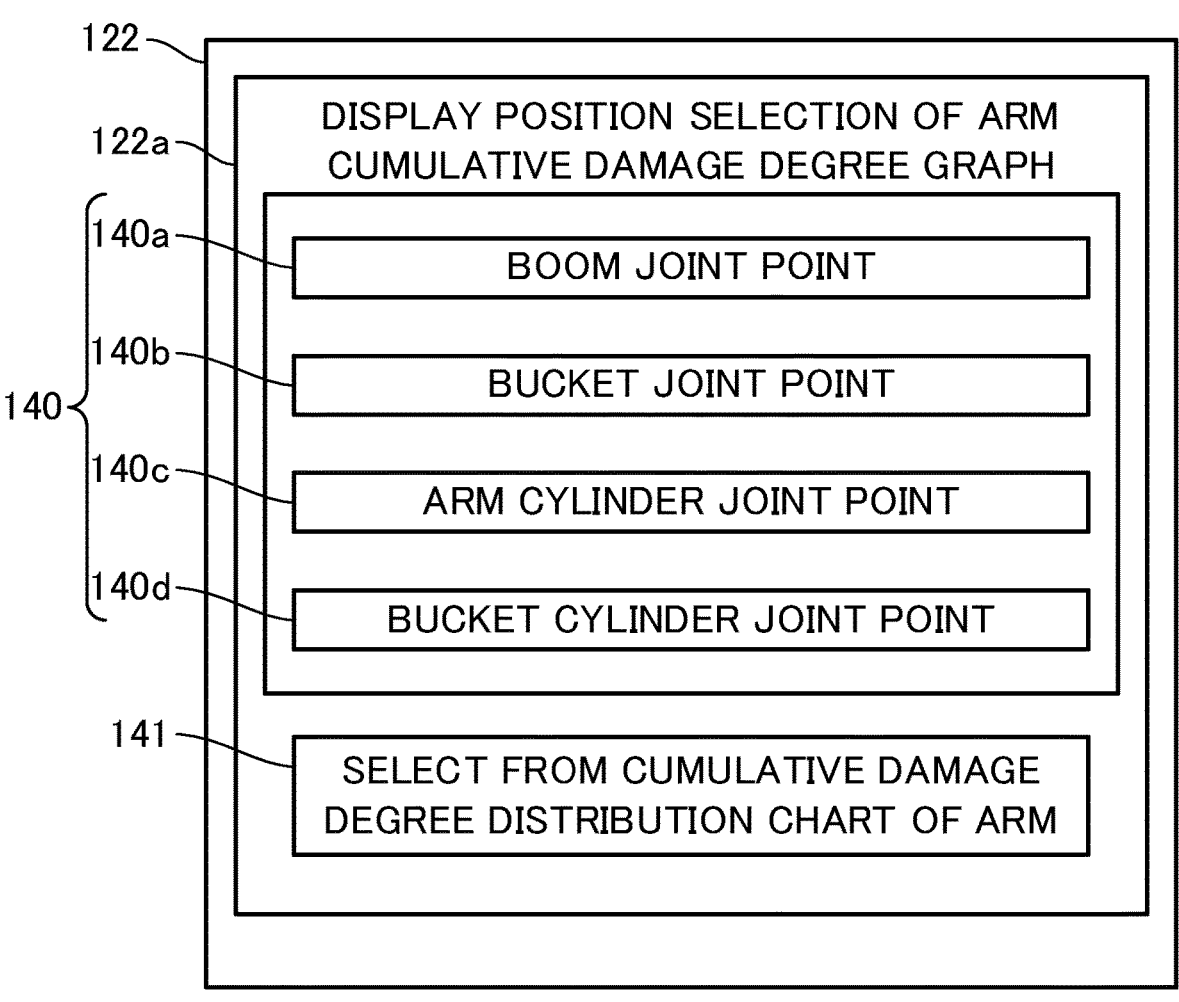
FIG. 5 is a diagram for illustrating an example of a position selection screen displayed on a display device.

In Step S110, the in-vehicle controller 110 displays a position selection screen on a display screen 122a of the display device 122. FIG. 5 is a diagram for illustrating an example of the position selection screen displayed on the display device 122. The display device 122 reads the position selection screen including an image representing a plurality of pieces of position information which are stored in the nonvolatile memory 112 and correspond to the elements obtained by dividing the plurality of driven members into a plurality of small areas, on the basis of a control signal from the in-vehicle controller 110 and displays the same on the display device 122. For example, as illustrated in FIG. 5, a registered position selection area 140 in which a predetermined position in the arm 12 stored (registered) in the nonvolatile memory 112 can be selected and a free designation area 141 for shifting to a position designation screen (see FIG. 6) where a desired position in the arm 12 can be designated are displayed in advance on the position selection screen.

The registered position selection area 140 is an area for selecting a predetermined joint point from among a plurality of joint points in the arm 12. In the registered position selection area 140, a boom joint point selection button 140a for selecting a boom joint point, a bucket joint point selection button 140b for selecting a bucket joint point, an arm cylinder joint point selection button 140c for selecting an arm cylinder joint point, and a bucket cylinder joint point selection button 140d for selecting a bucket cylinder joint point are displayed. The joint points in the arm 12 are more likely to be damaged than other regions in the arm 12. Hence, the position information regarding the joint points in the arm 12 is stored in advance in the nonvolatile memory 112 as the positions of places with many damage cases. It should be noted that the joint point refers to a representative position in the regions of the arm 12 that are in contact with pins for joining the arm 12 to other members (the boom 11, the arm cylinder 12a, the bucket 13, and the bucket cylinder 13a).

As illustrated in FIG. 4, when the process of Step S110 is completed, the in-vehicle controller 110 proceeds to Step S115 to determine whether or not the free designation area 141 has been operated. When the free designation area 141 (see FIG. 5) is touched in Step S115, the in-vehicle controller 110 determines that the free designation area 141 has been operated and proceeds to Step S130. In a case where the free designation area 141 is not touched in Step S115, the in-vehicle controller 110 determines that the free designation area 141 has not been operated and proceeds to Step S120.

In Step S120, the in-vehicle controller 110 determines whether or not a predetermined position (joint point) has been selected. When any one of the joint point selection buttons 140a to 140d is touched in Step S120, the in-vehicle controller 110 determines that a predetermined position (joint point) has been selected and proceeds to Step S160. In a case where none of the joint point selection buttons 140a to 140d is touched in Step S120, the in-vehicle controller 110 determines that a predetermined position (joint point) has not been selected and returns to Step S115.

In Step S130, the in-vehicle controller 110 computes the stress in each element of the mesh data of the arm 12 by the finite element method on the basis of the posture information and the action information (the action information regarding the actuators acquired from the cylinder pressure gauge 124a, the hydraulic operating oil thermometer 124b, the engine tachometer 124c, the hydraulic pump delivery pressure gauge 124d, the hydraulic motor inlet pressure gauge 124e, the accelerometer 124f, and the like) regarding the work machine 100 that are stored in the nonvolatile memory 112. The stress in each element is computed every predetermined time interval from the reference time (for example, the time at which the work machine 100 was shipped) to the current time (the latest time stored in the nonvolatile memory 112) and is stored in the nonvolatile memory 112. It should be noted that, in a case where the computation to be performed by a predetermined time that falls between the reference time and the current time has already been completed, only the computation of the stress generated from the above predetermined time to the current time is performed.

When the process of Step S130 is completed, the in-vehicle controller 110 proceeds to Step S135 to execute a computation process of the cumulative damage degree. In Step S135, the in-vehicle controller 110 computes the cumulative damage degree in each element on the basis of the temporal changes in stress in each element and stores the same in the nonvolatile memory 112. The cumulative damage degree in each element is computed every predetermined time interval from the reference time to the current time and is stored in the nonvolatile memory 112. It should be noted that, in a case where the computation to be performed by the predetermined time that falls between the reference time and the current time has already been completed, only the computation of the cumulative damage degree caused from the above predetermined time to the current time is performed.

In the nonvolatile memory 112, the operation status, the stress of each element, and the time are stored in association with each other. In Step S135, the in-vehicle controller 110 computes the cumulative damage degree of each element for each operation status on the basis of the information stored in the nonvolatile memory 112, and stores the temporal changes in the cumulative damage degree for each operation status in the nonvolatile memory 112. That is, in the nonvolatile memory 112, the temporal changes in the cumulative damage degree computed irrespective of the operation status and the temporal changes in the cumulative damage degree computed for each operation status are stored.

Figure 6:
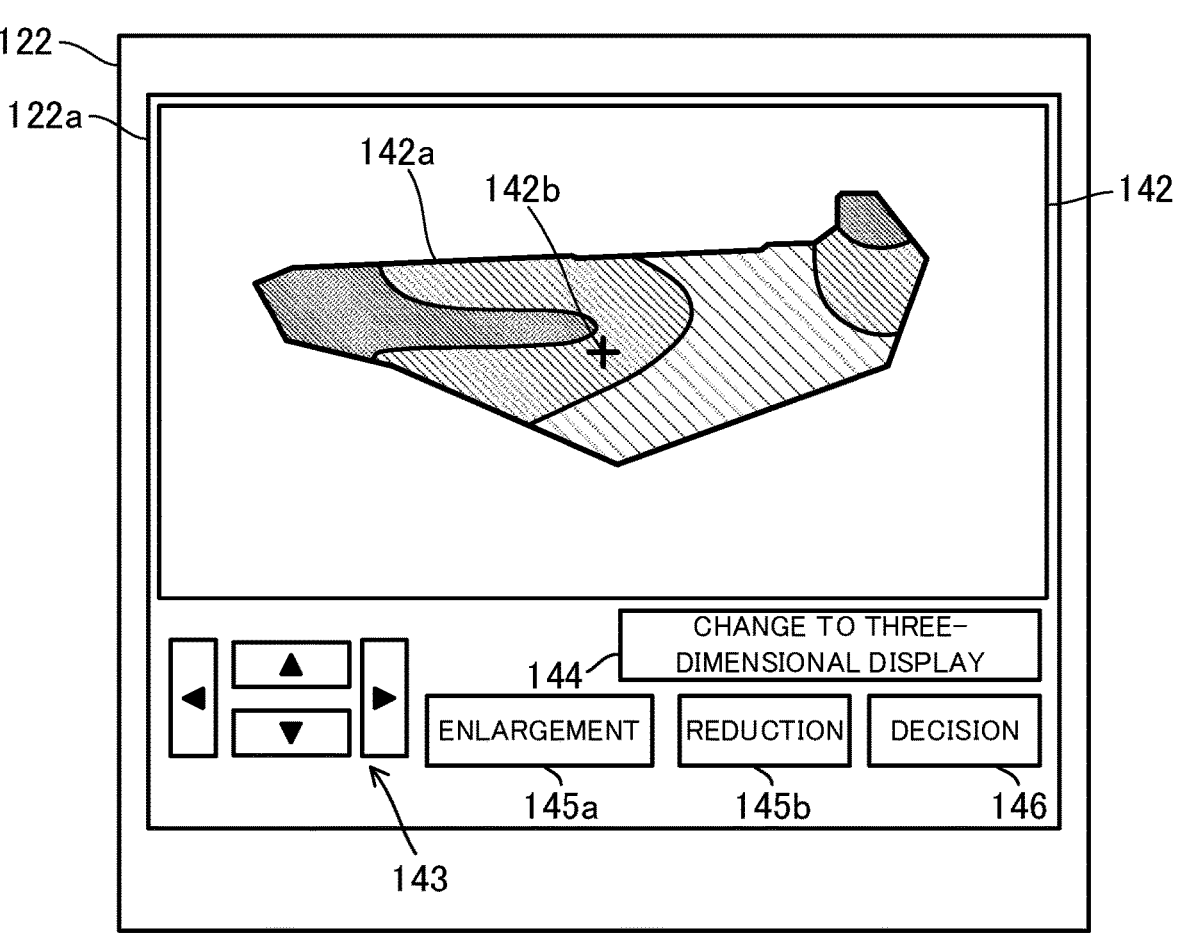
FIG. 6 is a diagram for illustrating an example of a position designation screen displayed on the display device.

When the process of Step S135 is completed, the in-vehicle controller 110 proceeds to Step S140 and displays the position designation screen on the display screen 122a of the display device 122 on the basis of the cumulative damage degree (the cumulative damage degree computed irrespective of the operation status) of each element at the current time stored in the nonvolatile memory 112. FIG. 6 is a diagram for illustrating an example of the position designation screen displayed on the display device 122, and FIG. 7 is a diagram for illustrating another example of the position designation screen displayed on the display device 122.

Figure 7:
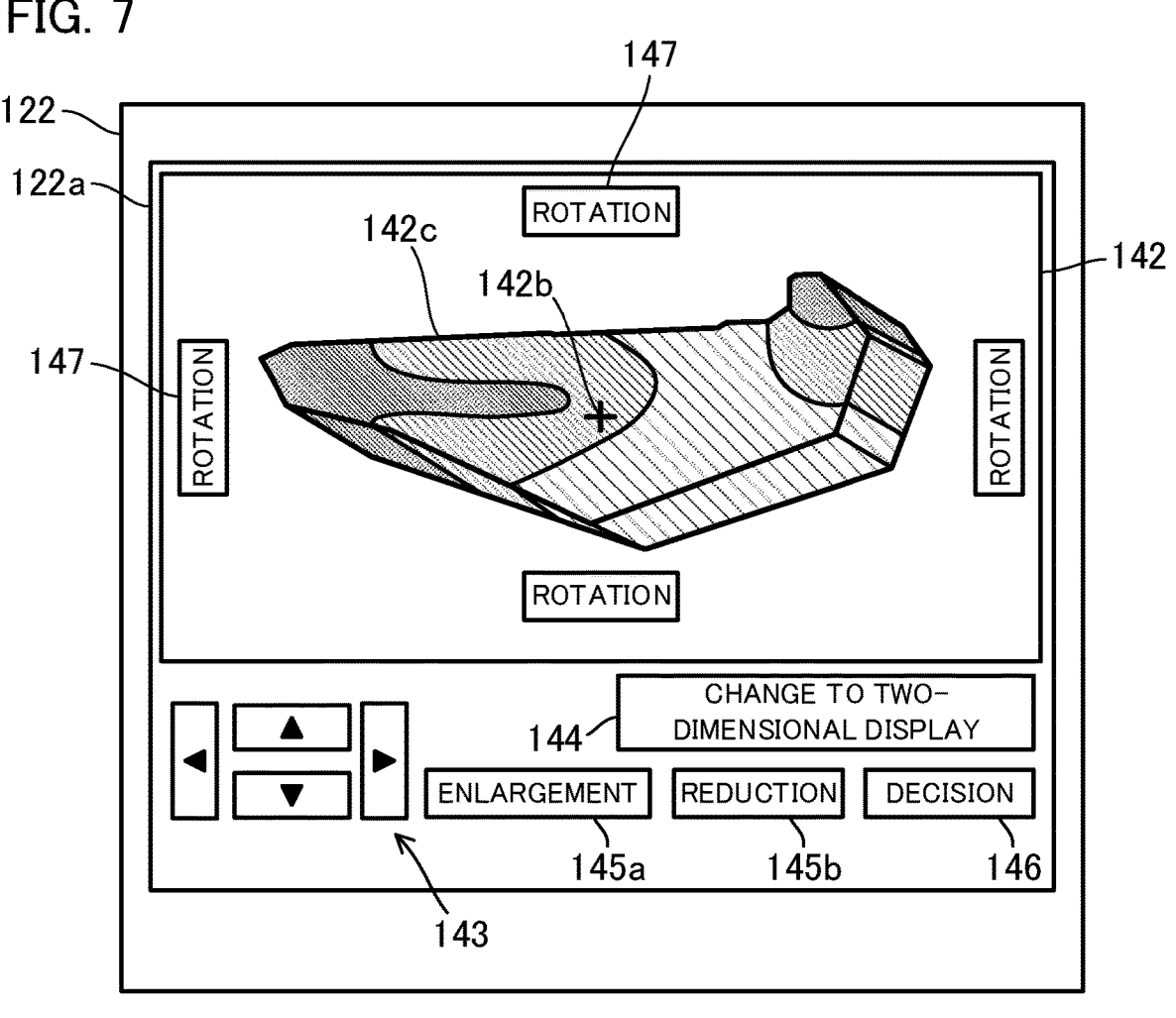
FIG. 7 is a diagram for illustrating another example of the position designation screen displayed on the display device.

As illustrated in FIG. 6 and FIG. 7, a rectangular distribution chart display area 142, image move buttons 143, a display format change button 144, an enlargement button 145a, a reduction button 145b, and a decision button 146 are displayed on the position designation screen. In the distribution chart display area 142, arm images 142a and 142c representing the local distribution of the cumulative damage degrees of the arm 12 at the current (latest) time are displayed. In addition, a center mark 142b is displayed at the center of the distribution chart display area 142. As described above, the display device 122 displays the local distribution of the cumulative damage degrees of the driven member on the basis of the control signal from the in-vehicle controller 110.

When the image move buttons 143 are touched, the in-vehicle controller 110 moves the arm images 142a and 142c within the distribution chart display area 142. The image move buttons 143 have a move-up button, a move-down button, a move-left button, and a move-right button. For example, when the move-up button is touched by the user, the arm images 142a and 142c are moved in the upper direction within the distribution chart display area 142 only while the touch operation is being performed.

When the enlargement button 145a is touched, the in-vehicle controller 110 enlarges the arm images 142a and 142c about the center mark 142b within the distribution chart display area 142. When the reduction button 145b is touched, the in-vehicle controller 110 reduces the arm images 142a and 142c about the center mark 142b within the distribution chart display area 142.

The in-vehicle controller 110 changes the display format of the arm images 142a and 142c displayed in the distribution chart display area 142, every time the display format change button 144 is touched. As illustrated in FIG. 6, when the display format change button 144 is touched by the user in a state where the arm image 142a is displayed in a two-dimensional format, the in-vehicle controller 110 causes the display device 122 to display the position designation screen illustrated in FIG. 7.

On the position designation screen illustrated in FIG. 7, the three-dimensional arm image 142c and a plurality of rotation buttons 147 for rotating the three-dimensional arm image 142c in the up, down, left, and right directions are displayed in the distribution chart display area 142. As illustrated in FIG. 7, when the display format change button 144 is touched by the user in a state where the arm image 142a is displayed in a three-dimensional format, the in-vehicle controller 110 causes the display device 122 to display the position designation screen illustrated in FIG. 6.

The in-vehicle controller 110 generates composite images obtained by combining the local distribution of the cumulative damage degrees with an image in which a virtual arm 12 is viewed from a virtual viewpoint in a virtual space, as the arm images 142a and 142c, and causes the display device 122 to display the same. In the example illustrated in FIG. 6, the in-vehicle controller 110 generates a composite image obtained by combining the local distribution of the cumulative damage degrees with an image in which three-dimensional shape data of the arm 2 is viewed from the left viewpoint, as the arm image 142a. In the example illustrated in FIG. 7, when the rotation buttons 147 are touched by the user, the in-vehicle controller 110 updates the arm image 142c by changing the position of the virtual viewpoint for generating the arm image 142c, on the basis of an input operation from the input device 121. Accordingly, the display image is successively changed in such a manner that the virtual arm 12 displayed on the display device 122 is rotated when the user operates the rotation buttons 147. Thus, the user can designate a position (for example, a position on the right surface, a position on the upper surface, or the like of the virtual arm 12) that could not be designated on the position designation screen illustrated in FIG. 6.

In the examples illustrated in FIG. 6 and FIG. 7, the arm images 142a and 142c are contour diagrams formed using contour lines of the arm 12 and colors representing the magnitudes of the cumulative damage degree. The arm images 142a and 142c are enlarged, reduced, or moved up, down, left, or right by the user. In the arm images 142a and 142c, the user superposes the center mark 142b on the position where the temporal changes in the cumulative damage degree are to be checked, and touches the decision button 146. When the decision button 146 is touched, the in-vehicle controller 110 sets a check position in the arm 12 that displays the temporal changes in the cumulative damage degree, on the basis of the position of the center mark 142b that is superposed on the arm image 142a or 142c.

It should be noted that, in a case where the center mark 142b is not superposed on the arm image 142a or 142c when the decision button 146 is touched, the in-vehicle controller 110 causes the display device 122 to display such an image as a message indicating that the time change graph of the cumulative damage degree cannot be displayed because the center mark 142b is not superposed on the arm image 142a or 142c.

As illustrated in FIG. 4, when the position designation screen is displayed on the display device 122 in Step S140, the in-vehicle controller 110 proceeds to Step S145. In Step S145, the in-vehicle controller 110 determines whether or not a predetermined position for displaying the temporal changes in the cumulative damage degree has been designated. In Step S145, when the decision button 146 is touched in a state where the center mark 142b is superposed on the arm image 142a or 142c, the in-vehicle controller 110 determines that a predetermined position has been designated and proceeds to Step S150. In Step S145, in a case where the decision button 146 is not touched in a state where the center mark 142b is superposed on the arm image 142a or 142c, the in-vehicle controller 110 determines that a predetermined position has not been designated. The position designation determination process (S145) is repeatedly executed until it is determined that a predetermined position has been designated.

In Step S150, the in-vehicle controller 110 refers to the nonvolatile memory 112 and generates the time change graph of the cumulative damage degree D in the element corresponding to the position designated in Step S145. The in-vehicle controller 110 displays the generated time change graph of the cumulative damage degree D on the display screen 122a of the display device 122. As described above, when the information regarding the position designated on the basis of the local distribution of the cumulative damage degrees is input from the input device 121 (Y in Step S145), the in-vehicle controller 110 sets a predetermined position on the basis of the input position information and outputs the temporal changes in the cumulative damage degree at the set predetermined position to the display device 122.

Figure 8:
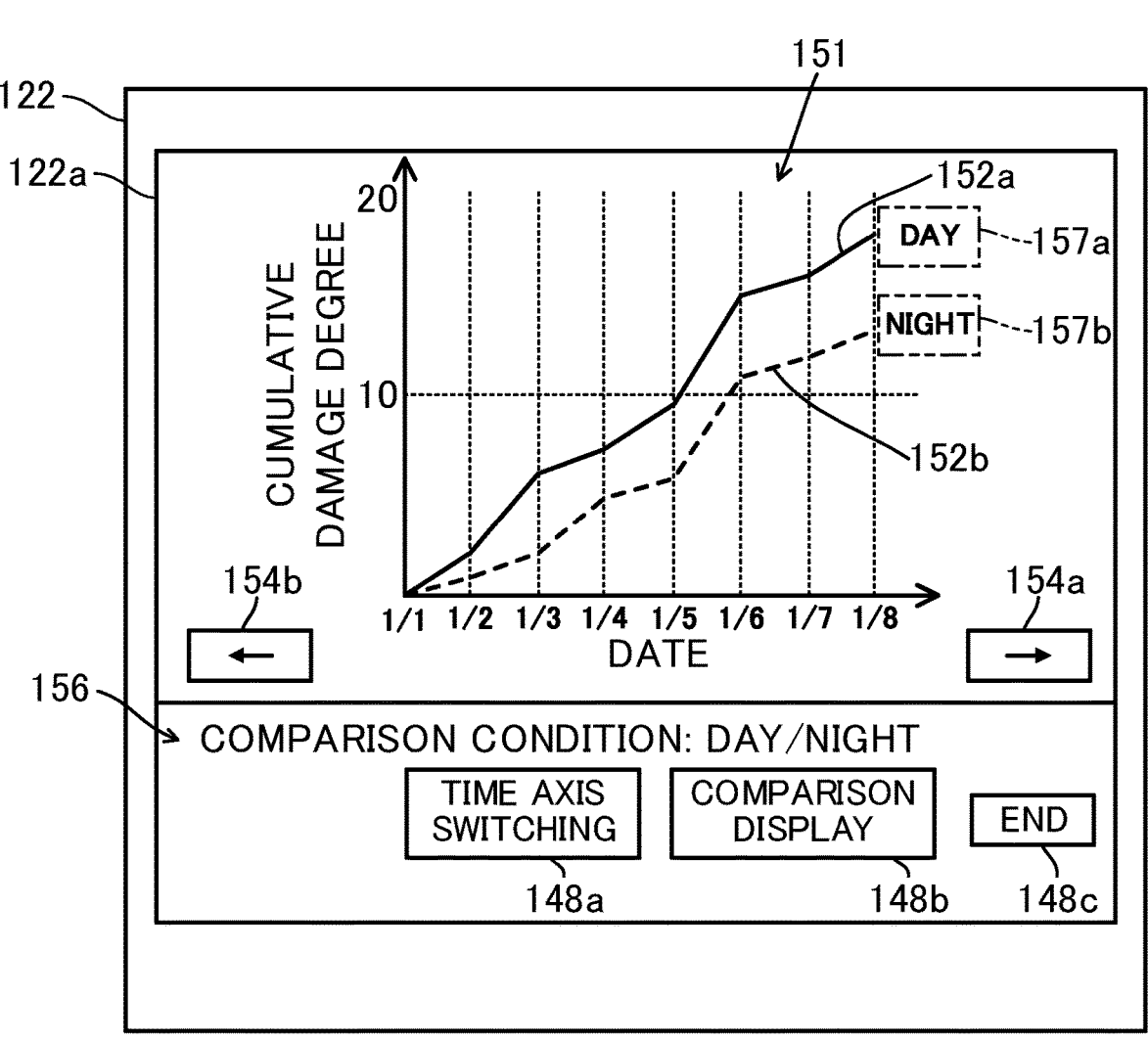
FIG. 8 is a diagram for illustrating an example of a cumulative damage degree display screen displayed on the display device.

FIG. 8 is a diagram for illustrating an example of a cumulative damage degree display screen displayed on the display device 122. As illustrated in FIG. 8, on the cumulative damage degree display screen, a time change graph 151 of the cumulative damage degree, display period change buttons 154a and 154b, a time axis switching button 148a, a comparison display selection button 148b, and an end button 148c are displayed. In the time change graph 151 of the cumulative damage degree, the horizontal axis represents the time axis, and the vertical axis represents the cumulative damage degree. In the example illustrated in FIG. 8, one day (24 hours) is set as a unit time, and the cumulative damage degree for each unit time is displayed in a line graph format. It should be noted that the format of the time change graph 151 of the cumulative damage degree is not limited to the line graph format, and may be a bar graph format.

The display period change buttons 154a and 154b are operation buttons for changing the display period of the time change graph 151 of the cumulative damage degree displayed on the display screen 122a. In the illustrated example, a period from January 1 to January 8 is the display period. For example, when the display period change button 154a is touched once in the illustrated state, the in-vehicle controller 110 causes the display device 122 to display the time change graph 151 of the cumulative damage degree for a display period from January 2 to January 9. Thereafter, when the display period change button 154b is touched once, the time change graph 151 of the cumulative damage degree for the display period from January 1 to January 8 is displayed on the display device 122.

The time axis switching button 148a is an operation button for changing the unit time of the time axis. Every time the time axis switching button 148a is touched, the in-vehicle controller 110 switches the unit time of the time axis in the order of "one day," "one week," "one month," and "one year." It should be noted that the setting of the unit time is not limited to these, and any period may be set as the unit time. For example, if the shift of operators is regular, one work cycle may be selected as the unit time. The in-vehicle controller 110 automatically adjusts the width of one scale for displaying the cumulative damage degree according to the set unit time.

The comparison display selection button 148b is an operation button for displaying a comparison condition selection screen for selecting the comparison condition of the operation status. As illustrated in FIG. 8, when the comparison display selection button 148b is touched by the user in a state where the cumulative damage degree display screen is displayed, the in-vehicle controller 110 causes the display device 122 to display the comparison condition selection screen.

Figure 9:
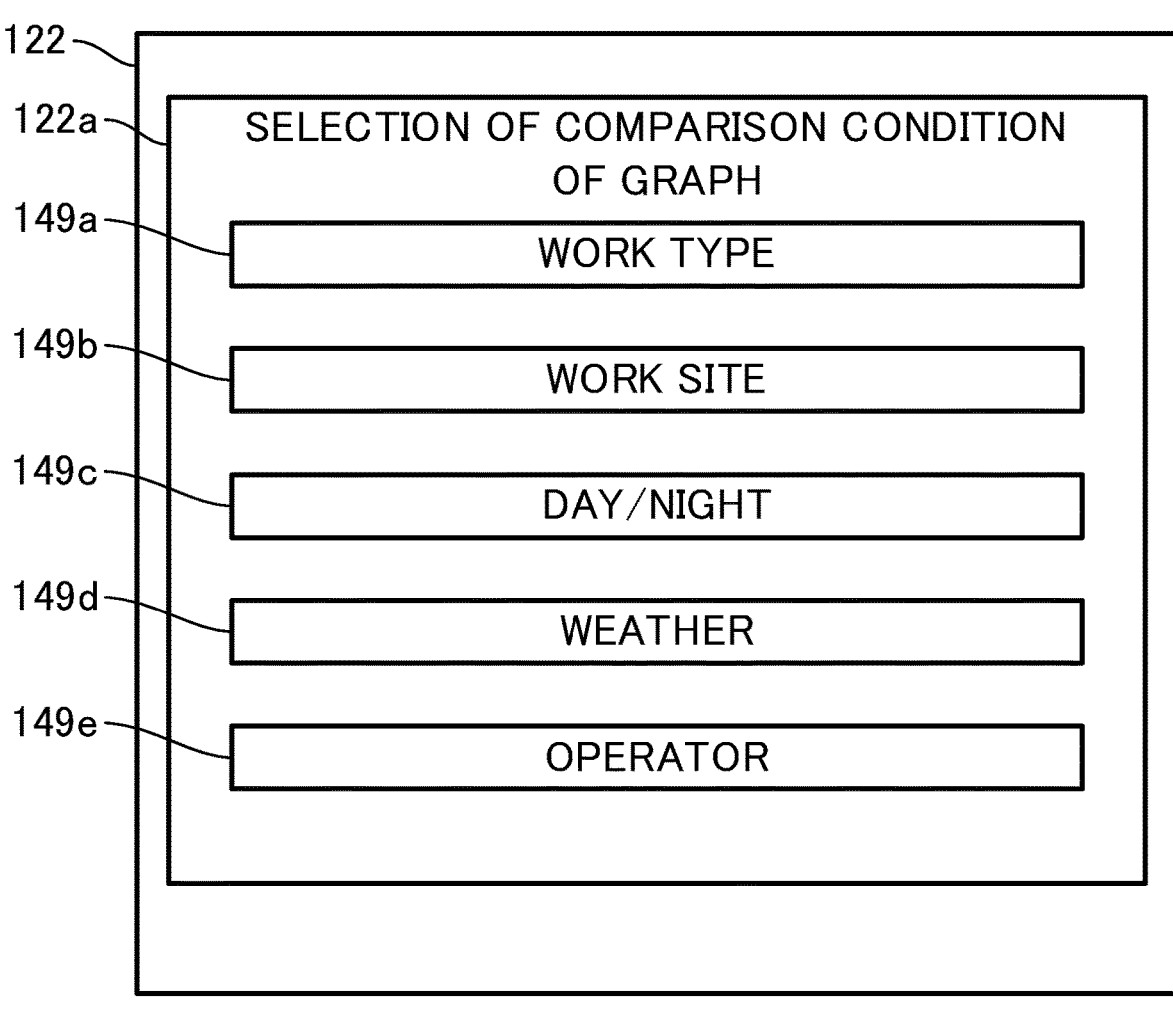
FIG. 9 is a diagram for illustrating an example of a comparison condition selection screen displayed on the display device.

FIG. 9 is a diagram for illustrating an example of the comparison condition selection screen displayed on the display device 122. As illustrated in FIG. 9, on the comparison condition selection screen, a work type selection button 149a for selecting a work type as a comparison condition, a work site selection button 149b for selecting a work site as a comparison condition, a day/night selection button 149c for selecting day/night as a comparison condition, a weather selection button 149d for selecting weather as a comparison condition, and an operator selection button 149e for selecting an operator as a comparison condition are displayed.

When the day/night selection button 149c is touched, the in-vehicle controller 110 sets day/night as a comparison condition, and causes the display device 122 to display the cumulative damage degree display screen as illustrated in FIG. 8. In a comparison condition display area 156 of the cumulative damage degree display screen, information regarding the set comparison condition is displayed. On the basis of the temporal changes in the cumulative damage degree for each operation status stored in the nonvolatile memory 112, the in-vehicle controller 110 displays side by side a first cumulative damage degree line 152a representing the temporal changes in the cumulative damage degree caused by work in a first operation status (day in the illustrated example) and a second cumulative damage degree line 152b representing the temporal changes in the cumulative damage degree caused by work in a second operation status (night in the illustrated example), both operation statuses corresponding to the set comparison condition. As described above, the temporal changes in the cumulative damage degree for each operation status can be displayed in a comparable manner in the embodiment.

It should be noted that, although the example illustrated in FIG. 8 depicts an example in which the first cumulative damage degree line 152a and the second cumulative damage degree line 152b are displayed in the same graph area, they may be displayed in different graph areas. In other words, in the example illustrated in FIG. 8, the horizontal axis (time axis) and the vertical axis of the first cumulative damage degree line 152a and the second cumulative damage degree line 152b are common, but the horizontal axis (time axis) and the vertical axis of the first cumulative damage degree line 152a and the horizontal axis (time axis) and the vertical axis of the second cumulative damage degree line 152b may be set separately.

The in-vehicle controller 110 displays an image of a word (day in the illustrated example) representing the first operation status in a first operation status name display area 157a in the vicinity of the first cumulative damage degree line 152a. In addition, the in-vehicle controller 110 displays an image of a word (night in the illustrated example) representing the second operation status in a second operation status name display area 157b in the vicinity of the second cumulative damage degree line 152b.

Although not illustrated in the drawing, when the work site selection button 149b (see FIG. 9) is touched, the in-vehicle controller 110 sets the work site as the comparison condition, and causes the display device 122 to display the cumulative damage degree display screen. In this case, the in-vehicle controller 110 causes the display device 122 to display the first cumulative damage degree line 152a representing the temporal changes in the cumulative damage degree caused by work at a work site A (first operation status) and the second cumulative damage degree line 152b representing the temporal changes in the cumulative damage degree caused by work at a work site B (second operation status). In addition, the in-vehicle controller 110 displays a character image of "work site A" in the first operation status name display area 157a and a character image of "work site B" in the second operation status name display area 157b. It should be noted that, in a case where there are three or more work sites, the in-vehicle controller 110 causes the display device 122 to display three or more cumulative damage degree lines.

Although not illustrated in the drawing, when the work type selection button 149a (see FIG. 9) is touched, the in-vehicle controller 110 sets the work type as the comparison condition, and causes the display device 122 to display the cumulative damage degree display screen. In this case, the in-vehicle controller 110 causes the display device 122 to display the first cumulative damage degree line 152a representing the temporal changes in the cumulative damage degree caused by work in the excavation and loading work (first operation status) and the second cumulative damage degree line 152b representing the temporal changes in the cumulative damage degree caused by work in the compaction work (second operation status). In addition, the in-vehicle controller 110 displays a character image of "excavation and loading work" in the first operation status name display area 157a and a character image of "compaction work" in the second operation status name display area 157b. It should be noted that, in a case where there are three or more work types, the in-vehicle controller 110 causes the display device 122 to display three or more cumulative damage degree lines.

Although not illustrated in the drawing, when the weather selection button 149d (see FIG. 9) is touched, the in-vehicle controller 110 sets the weather as the comparison condition, and causes the display device 122 to display the cumulative damage degree display screen. In this case, the in-vehicle controller 110 causes the display device 122 to display the first cumulative damage degree line 152a representing the temporal changes in the cumulative damage degree caused by work in fine weather (first operation status) and the second cumulative damage degree line 152b representing the temporal changes in the cumulative damage degree caused by work in rainy weather (second operation status). In addition, the in-vehicle controller 110 displays a character image of "fine weather" in the first operation status name display area 157a and a character image of "rainy weather" in the second operation status name display area 157b.

Although not illustrated in the drawing, when the operator selection button 149e (see FIG. 9) is touched, the in-vehicle controller 110 sets the operator as the comparison condition, and causes the display device 122 to display the cumulative damage degree display screen. In this case, the in-vehicle controller 110 causes the display device 122 to display the first cumulative damage degree line 152a representing the temporal changes in the cumulative damage degree caused by work in the status (first operation status) in which operation is performed by an operator A and the second cumulative damage degree line 152b representing the temporal changes in the cumulative damage degree caused by work in the status (second operation status) in which operation is performed by an operator B. In addition, the in-vehicle controller 110 displays a character image of "operator A" in the first operation status name display area 157a and a character image of "operator B" in the second operation status name display area 157b. It should be noted that the in-vehicle controller 110 may display the skill level of the operator A in the first operation status name display area 157a and the skill level of the operator B in the second operation status name display area 157b.

It should be noted that, although FIG. 8 depicts an example of a screen when day/night is set as the comparison condition, in a case where it is determined that a predetermined position has been designated in Step S145 (see FIG. 4), the graph of the temporal changes in the cumulative damage degree computed irrespective of the operation status may be displayed on the screen that is to be first displayed by the display device 122. In addition, a button for displaying the graph of the temporal changes in the cumulative damage degree computed irrespective of the operation status may be displayed on the screen that is to be displayed after the comparison condition is set. In this case, in a case where this button is touched, the in-vehicle controller 110 displays the graph of the temporal changes in the cumulative damage degree computed irrespective of the operation status on the display screen 122a of the display device 122.

As illustrated in FIG. 4, when the process of Step S150 is completed, the in-vehicle controller 110 proceeds to Step S190 to determine whether or not an end operation has been performed. In Step S190, when the end button 148c (see FIG. 8) is touched, the in-vehicle controller 110 determines that the end operation has been performed, hides the cumulative damage degree display screen, and terminates the process illustrated in the flowchart of FIG. 4. In Step S190, in a case where the end button 148c is not touched, the in-vehicle controller 110 determines that no end operation has been performed. The end operation determination process (S190) is repeatedly executed until it is determined that the end operation has been performed. It should be noted that, in a case where it is determined in the end operation determination process (S190) that the end operation has been performed, the in-vehicle controller 110 may return to Step S100 again to cause the display device 122 to display the driven member selection screen for selecting one driven member from among the boom 11, the arm 12, and the bucket 13.

In Step S160, the in-vehicle controller 110 executes the stress computation process that is similar to the process in Step S130, and proceeds to Step S165. In Step S165, the in-vehicle controller 110 executes the cumulative damage degree computation process that is similar to Step S135, and proceeds to Step S180.

In Step S180, the in-vehicle controller 110 executes the display process of the time change graph 151 of the cumulative damage degree that is similar to Step S150, and proceeds to Step S190. It should be noted that the process in Step S150 is the process for displaying the time change graph 151 of the cumulative damage degree at the position designated in Step S145. On the other hand, the process in Step S180 is the process for displaying the time change graph 151 of the cumulative damage degree at the position selected in Step S120, and this point is different from the process in Step S150. That is, when the position information selected from among the plurality of pieces of position information is input from the input device 121 (Y in Step S120), the in-vehicle controller 110 sets a predetermined position on the basis of the input position information and outputs the temporal changes in the cumulative damage degree of the element at the set predetermined position to the display device 122 (Step S180).

As described above, during the maintenance work of the work machine 100 that continues to operate over a long period of time, the state management device 10 according to the embodiment can output not only the cumulative damage degree at that time but also the temporal changes in the cumulative damage degree occurred from the last maintenance to the current maintenance. Hence, the user can check the temporal changes (rate of increase) in the cumulative damage degree caused by changes in the operation status in a case where the operation status has changed by the current maintenance from the last maintenance. Accordingly, the user can appropriately predict the life of the driven member.

It should be noted that, in addition to the above temporal changes in the cumulative damage degree, by acquiring temporal changes in the amount of mining by the work machine 100, maintenance management cost, and the like and comparing these with the temporal changes in the cumulative damage degree, it is possible to appropriately make a long-term work plan such as the selection of a timing for the next maintenance and economic management.

According to the above-described embodiment, the following effects can be obtained.

(1) The state management device 10 is a device that manages the state of the work machine 100. In the embodiment, the state management device 10 is mounted on the work machine 100. The work machine 100 includes the work device 4 that is configured by rotatably coupling, by a plurality of joints, a plurality of driven members (the boom 11, the arm 12, and the bucket 13) driven by a plurality of actuators (the boom cylinder 11a, the arm cylinder 12a, and the bucket cylinder 13a), the posture sensor 123 that senses posture information (the boom angle, the arm angle, and the bucket angle) regarding the work device 4, and the action sensor 124 that senses action information (pressures of the boom cylinder 11a, the arm cylinder 12a, and the bucket cylinder 13a, and the like) regarding the actuators.

In order to manage the state of the work machine 100, the state management device 10 includes the in-vehicle controller 110 that is a controller for performing a computation on the basis of the results of sensing by the posture sensor 123 and the action sensor 124, and the display device 122 that is an output device for outputting the result of computation by the in-vehicle controller 110, in a recognizable manner. On the basis of the posture information regarding the work device 4 and the action information regarding the actuators, the in-vehicle controller 110 computes the cumulative damage degree of the driven member, stores temporal changes in the cumulative damage degree at a predetermined position of the driven member of the work machine 100, and outputs the temporal changes in the cumulative damage degree at the predetermined position to the display device 122. The display device 122 displays the temporal changes in the cumulative damage degree at the predetermined position on the display screen 122a.

Accordingly, the user of the state management device 10 can check the temporal changes in the cumulative damage level at a predetermined position of the driven member. Thus, the user can appropriately make a long-term prediction of the cumulative damage degree, that is, a prediction of the life of the driven member of the work device 4. Further, on the basis of the temporal changes in the cumulative damage degree, the user can appropriately make a long-term work plan that includes the work content to be performed by the work machine 100, the amount of work per unit time, the work period, and the maintenance management cost of the work machine 100.

(2) The state management device 10 includes the non-volatile memory 112 in which a plurality of pieces of position information corresponding to elements obtained by dividing the plurality of driven members into a plurality of small areas are stored, the input device 121 for inputting an input operation signal into the in-vehicle controller 110, and the display device 122 that displays an image representing the plurality of pieces of position information, on the basis of a control signal from the in-vehicle controller 110. The input device 121 inputs the position information read from the nonvolatile memory 112 into the in-vehicle controller 110. When position information selected from among the plurality of pieces of position information is input from the input device 121, the in-vehicle controller 110 sets a predetermined position on the basis of the input position information, and outputs the temporal changes in the cumulative damage degree of the element at the set predetermined position to the display device 122. The display device 122 displays the temporal changes in the cumulative damage degree at the predetermined position on the display screen 122a.

According to this configuration, the information regarding the position (that is, the position where the cumulative damage degree is likely to become relatively high) of a place of the work machine 100 with many damage cases can be stored in the nonvolatile memory 112 in advance. In the embodiment, the position information regarding the joint parts between the driven members and the position information regarding the joint parts between the driven members and the actuators (hydraulic cylinders) are stored in the nonvolatile memory 112 in advance as a plurality of pieces of position information. Accordingly, it is possible to cause the display device 122 to display the graph of the temporal changes in the cumulative damage degree of a place with many damage cases by a simple operation. That is, according to the embodiment, the operation time of the user can be shortened.

(3) The state management device 10 includes the input device 121 for inputting position information to the in-vehicle controller 110; and the display device 122 that displays the local distribution of the cumulative damage degrees of the driven member on the basis of a control signal from the in-vehicle controller 110. When position information designated on the basis of the local distribution of the cumulative damage degrees is input from the input device 121, the in-vehicle controller 110 sets the predetermined position on the basis of the input position information, and outputs the temporal changes in the cumulative damage degree at the set predetermined position to the display device 122. The display device 122 displays the temporal changes in the cumulative damage degree at the predetermined position on the display screen 122a. Accordingly, the user can freely designate a position for which the user intends to check the temporal changes in the cumulative damage degree while checking the local distribution of the cumulative damage degrees.

(4) The in-vehicle controller 110 causes the display device 122 to display a composite image obtained by combining the local distribution of the cumulative damage degrees with an image in which the virtual driven member is viewed from a virtual viewpoint in a virtual space. The in-vehicle controller 110 changes the position of the virtual viewpoint on the basis of an input operation from the input device 121. According to this configuration, the user can freely designate a position for which the user intends to check the temporal changes in the cumulative damage degree while checking an image in which the driven member is viewed from any desired angle.

(5) The in-vehicle controller 110 outputs to the display device 122 the temporal changes in the cumulative damage degree for each of a plurality of operation statuses in a comparable manner. The display device 122 displays on the display screen 122a a display image in a mode in which the temporal changes in the cumulative damage degree for each of a plurality of operation statuses can be compared with each other. Accordingly, it is possible to easily identify the operation status that has a significant effect on the temporal changes in the cumulative damage degree. As a result, the user can appropriately make a long-term work plan.

Second Embodiment

Figure 10:
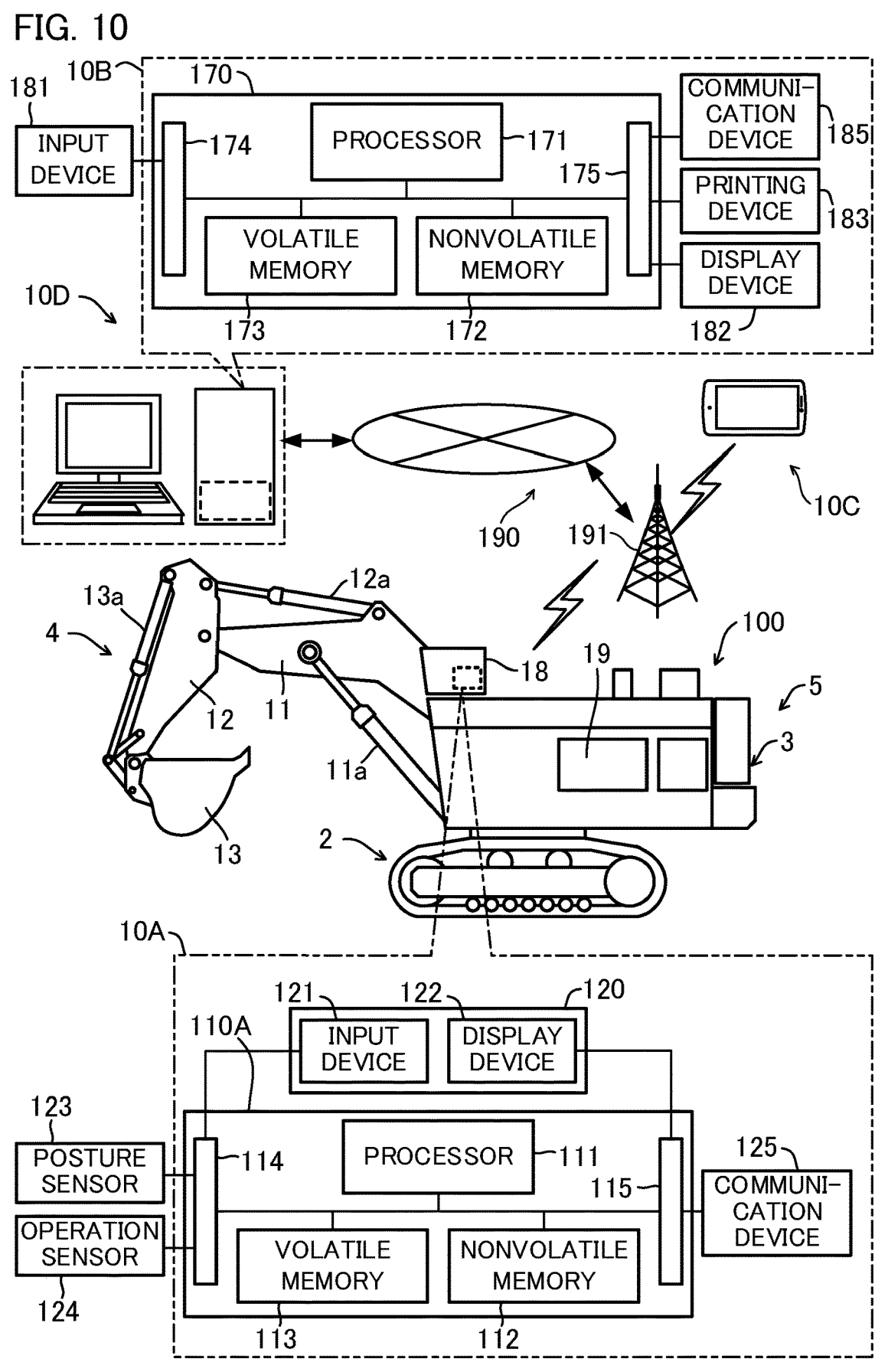

A state management device 10B according to a second embodiment will be described with reference to FIG. 10 and FIG. 11. It should be noted that in the drawings, the same or equivalent parts as those in the first embodiment are given the same reference characters, and the differences are mainly explained. In the first embodiment, the example (see FIG. 1) in which the state management device 10 is mounted on the work machine 100 that is to be managed has been described. In contrast, the state management device 10B according to the second embodiment is installed in an external facility provided outside the work machine 100 that is to be managed. FIG. 10 is a diagram for illustrating a configuration of the state management device 10B according to the second embodiment. As illustrated in FIG. 10, the state management device 10B is an external device that remotely manages (identifies and monitors) the state of the work machine 100. The state management device 10B is installed in an external facility provided in, for example, the head office, a branch office, or a factory of the manufacturer (maker) of the work machine 100, a rental company of the work machine 100, a data center that specializes in the operation of servers, a facility of the owner who owns the work machine 100, or the like.

In the second embodiment, a state management system 10D includes an information management device 10A mounted on the work machine 100, the state management device 10B installed in an external facility, and a mobile terminal 10C. The mobile terminal 10C is a smartphone, a tablet PC, a notebook PC, or the like.

The state management system 10D performs bidirectional communication via a communication network 190, which is a wide-area network, with the information management device 10A mounted on the work machine 100 that performs work at a work site, the state management device 10B installed at a place away from the work site, and the mobile terminal 10C carried by a maintenance worker who performs maintenance of the work machine 100 at the work site.

The communication network 190 is a mobile phone communication network (mobile communication network) developed by a mobile phone company or the like, the Internet, or the like. For example, in a case where the information management device 10A and a wireless base station 191 are connected to each other by a mobile phone communication network (mobile communication network), when receiving vehicle body data from the information management device 10A, the wireless base station 191 transmits the received vehicle body data to the state management device 10B via the Internet. The state management device 10B displays the vehicle body data acquired from the information management device 10A on a display screen of a display device 182.

The state management device 10B includes a management server 170, which is a controller for controlling the display device 182, a printing device 183, and a communication device 185, the communication device 185 for communicating with the information management device 10A and the mobile terminal 10C through the communication network 190, an input device 181 for inputting predetermined information to the management server 170 on the basis of an operation performed by the user of the state management device 10B, the display device 182 for displaying a display image on a display screen on the basis of a control signal from the management server 170, and the printing device 183 for printing a print image on paper on the basis of a control signal from the management server 170.

The management server (controller) 170 includes a computer including a processor 171 such as a CPU (Central Processing Unit), an MPU (Micro Processing Unit), and a DSP (Digital Signal Processor), a nonvolatile memory 172 such as a ROM (Read Only Memory), a flash memory, and a hard disk drive, a volatile memory 173 that is what is generally called a RAM (Random Access Memory), an input interface 174, an output interface 175, and other peripheral circuits. It should be noted that the management server 170 may include one computer or a plurality of computers.

Programs capable of executing various computations are stored in the nonvolatile memory 172. That is, the nonvolatile memory 172 is a storage medium capable of reading a program for realizing the function of the embodiment. The processor 171 is a processing device that expands the program stored in the nonvolatile memory 172 into the volatile memory 173 to execute a computation, and performs a predetermined computation process for data taken in from the input interface 174, the nonvolatile memory 172, and the volatile memory 173 according to the program.

The input interface 174 converts an input signal into data that can be computed by the processor 171. In addition, the output interface 175 generates a signal for output according to the computation result in the processor 171, and outputs the signal to the display device 182, the printing device 183, and the communication device 185.

Figure 11:
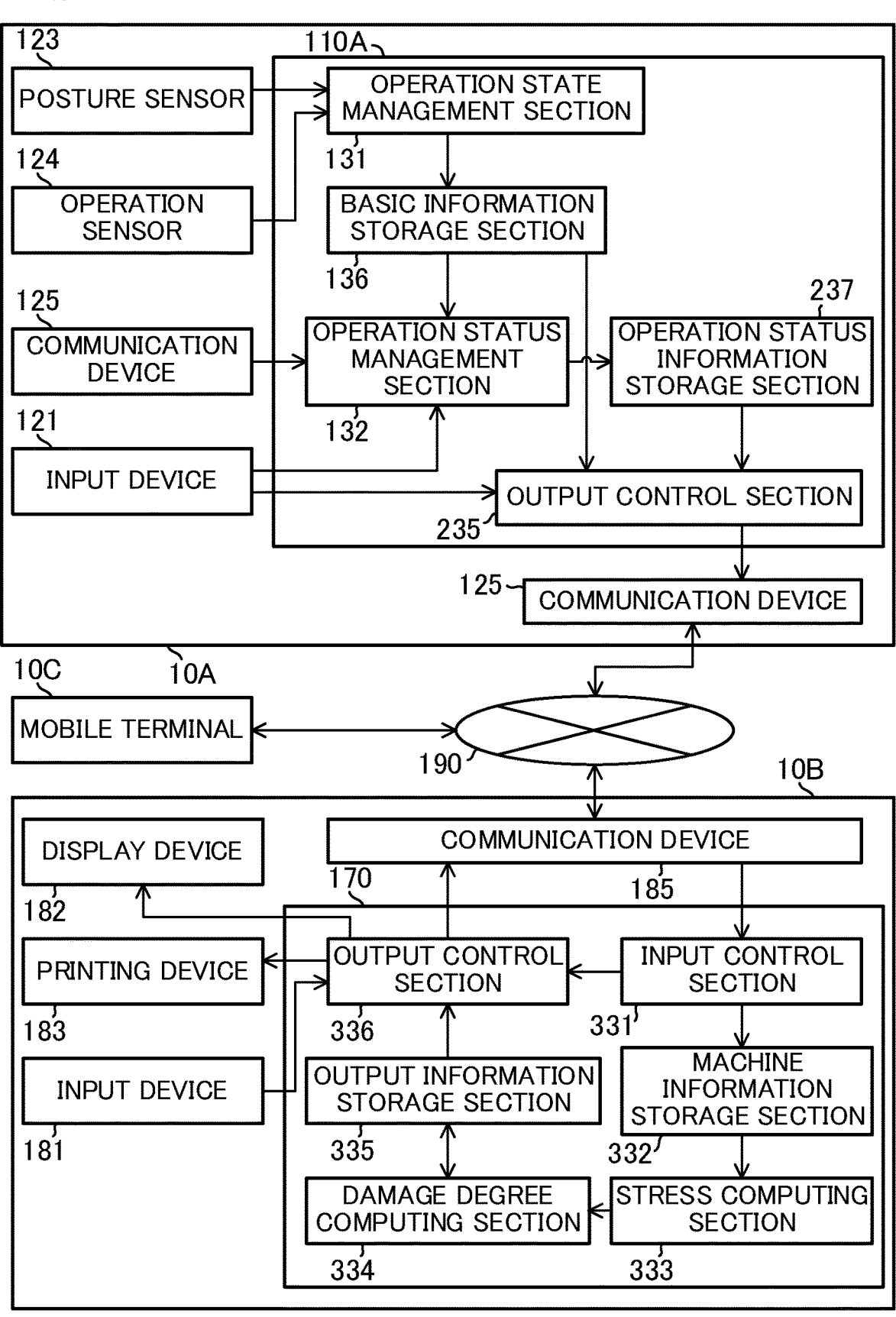
FIG. 11 is a functional block diagram of an in-vehicle controller and a management server.

FIG. 11 is a functional block diagram of an in-vehicle controller 110A and the management server 170. The in-vehicle controller 110A has the operation state management section 131, the basic information storage section 136, and the operation status management section 132 described in the first embodiment. In addition, the in-vehicle controller 110A has an operation status information storage section 237 instead of the display information storage section 137 described in the first embodiment, and an output control section 235 instead of the output control section 135 described in the first embodiment.

The operation status management section 132 stores the operation status in the operation status information storage section 237 in association with time. By means of the communication device 125, the output control section 235 transmits the posture information regarding the work machine 100 and the action information regarding the actuators, which are stored in the basic information storage section 136, and the operation status stored in the operation status information storage section 237 to the management server 170 via the communication network 190 together with identification information regarding the work machine 100.

The management server 170 has an input control section 331, a machine information storage section 332, a stress computing section 333, a damage degree computing section 334, an output information storage section 335, and an output control section 336. The functions of the input control section 331, the stress computing section 333, the damage degree computing section 334, and the output control section 336 are exhibited by the processor 171 executing the programs stored in the nonvolatile memory 172. The functions of the machine information storage section 332 and the output information storage section 335 are exhibited by the programs stored in the nonvolatile memory 172. It should be noted that the stress computing section 333 also has a function to serve as a stress storage section for storing temporal changes in the computed stress, and the function is exhibited by the programs stored in the nonvolatile memory 172.

The input control section 331 acquires the posture information, the action information, the operation status, and the identification information regarding the work machine 100 transmitted from the in-vehicle controller 110A by means of the communication device 185, and stores the same in the machine information storage section 332. In addition, the input control section 331 also acquires information from the mobile terminal 10C by means of the communication device 185. Application software capable of displaying the screens as illustrated in FIG. 5 to FIG. 9 is installed on the mobile terminal 10C on the basis of the information from the management server 170.

In the machine information storage section 332, three-dimensional shape data and dimension data regarding the driven members configuring the work device 4 are stored. The three-dimensional shape data and the dimensional data are associated with the identification information regarding the work machine 100. It should be noted that the three-dimensional shape data includes mesh data regarding the driven members of the work device 4. In addition, in the machine information storage section 332, position information regarding elements of each joint part in the boom 11, position information regarding elements of each joint part in the arm 12, and position information regarding elements of each joint part in the bucket 13 are stored in advance as a plurality of pieces of position information. In addition, in the machine information storage section 332, boundary condition setting data for setting boundary conditions according to the posture of the work device 4 is stored in advance.

The stress computing section 333 has the function similar to that of the stress computing section 133 described in the first embodiment, and computes and stores the stresses generated in the driven members of the work device 4, by stress analysis based on the well-known finite element method, on the basis of the information stored in the machine information storage section 332. The damage degree computing section 334 has the function similar to that of the damage degree computing section 134 described in the first embodiment, computes the cumulative damage degrees of the driven members on the basis of the temporal changes in the stresses computed by the stress computing section 333, and stores the computation result in the output information storage section 335.

On the basis of the input information from the input device 181, the output control section 336 causes the display device 182 to output (display) the temporal changes (display image) in the cumulative damage degree at a predetermined position of the driven member that are stored in the output information storage section 335, similarly to the output control section 135 described in the first embodiment.

It should be noted that, on the basis of the input information from the input device 181, the output control section 336 causes the printing device 183 to output (print) the temporal changes (print image) in the cumulative damage degree at the predetermined position of the driven member that are stored in the output information storage section 335. In addition, on the basis of the input information from the mobile terminal 10C, the output control section 336 causes the communication device 185 to output (transmit) the temporal changes in the cumulative damage degree at the predetermined position of the driven member that are stored in the output information storage section 335 to the mobile terminal 10C. On the basis of the information input from the management server 170, the mobile terminal 10C displays the temporal changes (display image) in the cumulative damage degree on the display screen.

According to such a second embodiment, the following effects can be obtained in addition to the effects similar to those of the first embodiment.

(6) The state management device 10B is installed in an external facility far away from the work machine 100. Thus, the user can remotely manage the state of the work machine 100 including the life prediction of the driven members of the work machine 100.

(7) The state management device 10B includes the communication device (output device) 185 that transmits (outputs) the temporal changes in the cumulative damage degree to the mobile terminal (external equipment) 10C. Thus, the maintenance worker can manage the state of the work machine 100 including the life prediction of the driven members of the work machine 100 without boarding the work machine 100.

(8) The state management device 10B includes the printing device (output device) 183 that prints (outputs) the temporal changes in the cumulative damage degree. Thus, it is possible to output the temporal changes in the cumulative damage degree as a document such as a maintenance report.

The following modified examples are also within the scope of the present invention, and it is possible to combine the configurations illustrated in the modified examples with the configurations described in the above embodiments, combine the configurations described in the above different embodiments with each other, or combine the configurations described in the following different modified examples with each other.

Modified Example 1

The types of the operation statuses are not limited to those described in the above embodiments. For example, the nature of the soil at the work site may be stored in the nonvolatile memory 112 as the operation status. In this configuration, the temporal changes in the cumulative damage degree are output for each nature of the soil. According to this configuration, it is possible to appropriately predict the life of the driven members in consideration of the impact of the nature of the soil on the rate of increase in the damage degree.

Modified Example 2

The controllers (110 and 170) may output to the output device the temporal changes of another piece of data for a predetermined period together with the temporal changes in the cumulative damage degree within the predetermined period. For example, the controllers (110 and 170) may cause the display devices 122 and 182 to display a graph of the temporal changes in the amount of mining together with a graph of the temporal changes in the cumulative damage degree within the predetermined period. Accordingly, the user can appropriately predict the life of the driven members in consideration of the impact of the amount of mining on the temporal changes (rate of increase) in the cumulative damage degree by comparing the temporal changes in the cumulative damage degree with the temporal changes in the amount of mining.

Modified Example 3

In the first embodiment, the example in which the output device for outputting the temporal changes in the cumulative damage degree is the display device 122 has been described, but the present invention is not limited to this. In the first embodiment, the output device can also be the printing device or the communication device described in the second embodiment.

Modified Example 4

In the above embodiments, the hydraulic excavator has been described as an example of the work machine, but the present invention is not limited to this, and the present invention can also be applied to work machines such as a wheel loader, a forklift, a dump truck, and a crane.

Modified Example 5

In the first embodiment, the example in which the cumulative damage degree is computed by stress analysis using the finite element method has been described, but other numerical analysis methods or statistical methods such as regression analysis may be used according to the computation processing capacity of the work machine 100.

Modified Example 6

In the first embodiment, the example in which the cumulative damage degree D is stored in the nonvolatile memory 112 has been described, but information that replaces the cumulative damage degree D may be stored in the nonvolatile memory 112 in order to easily recognize the damage status. For example, a value computed by weighting the cumulative damage degree D according to the use environment of the work machine 100 or the material characteristics of each part or a value corrected such that the numerical value representing the cumulative damage degree falls within the range of 0 to 100 may be stored in the nonvolatile memory 112.

Although the embodiments of the present invention have been described above, the above embodiments merely illustrate a part of the application of the present invention, and the technical scope of the present invention is not intended to be limited to the specific configuration of the above embodiments.

DESCRIPTION OF REFERENCE CHARACTERS

2: Track structure
3: Swing structure
4: Work device
5: Machine body
10, 10B: State management device
10C: Mobile terminal (input device and output device)
10D: State management system
11: Boom (driven member)
11*a*: Boom cylinder (actuator)
12: Arm (driven member)
12*a*: Arm cylinder (actuator)
13: Bucket (driven member)
13*a*: Bucket cylinder (actuator)
100: Work machine
110: In-vehicle controller (controller)
112: Nonvolatile memory
121: Input device
122: Display device (output device)
123: Posture sensor
124: Action sensor
124*a*: Cylinder pressure gauge
124*b*: Hydraulic operating oil thermometer
124*c*: Engine tachometer
124*d*: Hydraulic pump delivery pressure gauge
124*e*: Hydraulic motor inlet pressure gauge
124*f*: Accelerometer
125: Communication device (output device)
131: Operation state management section
132: Operation status management section
133: Stress computing section
134: Damage degree computing section
135: Output control section
136: Basic information storage section
137: Display information storage section
170: Management server (controller)
172: Nonvolatile memory
181: Input device
182: Display device (output device)
183: Printing device (output device)
185: Communication device (output device)
222: Machine information storage section
235: Output control section
237: Operation status information storage section
331: Input control section
333: Stress computing section
334: Damage degree computing section
335: Output information storage section
336: Output control section
The invention claimed is:
1. A state management device for a work machine, the device comprising:
a controller; and
an output device,
the controller being configured to perform a computation on a basis of results of sensing performed by a posture sensor that senses posture information regarding a work device that is configured by rotatably coupling, via pins serving as a plurality of joints, a plurality of driven members driven by a plurality of actuators and an action sensor that senses action information regarding the actuators, in order to manage a state of the work machine including the work device, the posture sensor, and the action sensor, and the output device outputting a result of computation performed by the controller, in a recognizable manner, wherein, the state management device further comprises an input device for inputting a predetermined information to the controller on a basis of an operation performed by a user, and the controller is configured to compute cumulative damage degrees of a plurality of elements obtained by dividing the driven member into a plurality of small areas corresponding to a joint point that is a portion of the driven member in contact with a first pin that joins the driven member and another driven member among the plurality of driven members, and a joint point that is a portion of the driven member in contact with a second pin that joins the driven member and an actuator among the plurality of actuators, on a basis of the posture information regarding the work device and the action information regarding the actuators, store temporal changes in the cumulative damage degree in the plurality of elements of the driven member, for each of the elements, and output, in graph format, to the output device, the temporal changes in the cumulative damage degree in an element corresponding to a predetermined position of the driven member, the position being selected or designated based on the operation of the input device, from among the temporal changes in the cumulative damage degree in the plurality of elements of the driven member.

2. The state management device for the work machine according to claim 1, the device comprising:

a nonvolatile memory in which a plurality of pieces of position information corresponding to the plurality of elements of the plurality of driven members are stored; and a display device that displays an image representing the plurality of pieces of position information, on a basis of a control signal from the controller, wherein, the input device is configured to perform an input for selecting the position information from the image displayed on the display device on the basis of the operation performed by the user, and the controller is configured to set the predetermined position on a basis of the input position information, and output the temporal changes in the cumulative damage degree of a corresponding one of the elements at the set predetermined position to the output device, when position information selected from among the plurality of pieces of position information is input from the input device.

3. The state management device for the work machine according to claim 1, the device comprising:

a display device that displays an image representing a local distribution of the cumulative damage degrees of a corresponding one of the driven members on a basis of a control signal from the controller, wherein, the input device is configured to perform an input for designating a specific position of the image displayed on the display device on the basis of the operation performed by the user, and the controller is configured to set the predetermined position on a basis of the input position information, and output the temporal changes in the cumulative damage degree at the set predetermined position to the output device, when position information designated by the user on a basis of the image representing the local distribution of the cumulative damage degrees is input from the input device.

4. The state management device for the work machine according to claim 3, wherein the controller is configured to cause the display device to display a composite image obtained by combining the local distribution of the cumulative damage degrees with an image in which a virtual driven member is viewed from a virtual viewpoint in a virtual space, and change a position of the virtual viewpoint on a basis of an input operation from the input device.

5. The state management device for the work machine according to claim 1, wherein the controller is configured to output to the output device the temporal changes in the cumulative damage degree for each of a plurality of operation statuses in a comparable manner.

* * * * *